United States Patent
Reses

(10) Patent No.: US 12,475,509 B1
(45) Date of Patent: Nov. 18, 2025

(54) INTELLIGENT ITEM FINANCING

(71) Applicant: Block, Inc., Oakland, CA (US)

(72) Inventor: Jacqueline Reses, Woodside, CA (US)

(73) Assignee: Block, Inc., Oakland, CA (US)

(*) Notice: Subject to any disclaimer, the term of this patent is extended or adjusted under 35 U.S.C. 154(b) by 0 days.

(21) Appl. No.: 17/509,156

(22) Filed: Oct. 25, 2021

Related U.S. Application Data

(63) Continuation of application No. 16/935,831, filed on Jul. 22, 2020, now Pat. No. 11,170,438.

(51) Int. Cl.
| | |
|---|---|
| *G06Q 40/03* | (2023.01) |
| *G06Q 20/08* | (2012.01) |
| *G06Q 20/34* | (2012.01) |
| *G06Q 40/12* | (2023.01) |
| *G06F 3/0481* | (2022.01) |
| *G06Q 30/08* | (2012.01) |

(52) U.S. Cl.
CPC ......... *G06Q 40/03* (2023.01); *G06Q 20/0855* (2013.01); *G06Q 20/34* (2013.01); *G06Q 40/12* (2013.12); *G06F 3/0481* (2013.01); *G06Q 30/08* (2013.01)

(58) Field of Classification Search
CPC ........ G06Q 40/03; G06Q 30/06; G06Q 20/10; G06Q 40/00; G06Q 40/02; G06Q 20/36; G06Q 10/10; G06Q 10/00; G06Q 30/08; G06Q 10/06
See application file for complete search history.

(56) References Cited

U.S. PATENT DOCUMENTS

| | | |
|---|---|---|
| 9,786,005 B1 | 10/2017 | Poursartip et al. |
| 11,170,438 B1 | 11/2021 | Reses |
| 11,847,581 B1* | 12/2023 | Bowers ............... G06Q 20/326 |
| 2007/0016519 A1 | 1/2007 | Neofytides et al. |
| 2007/0061257 A1 | 3/2007 | Blount, Jr. et al. |
| 2014/0258094 A1* | 9/2014 | Jouhikainen ........... G06Q 40/08 |
| | | 705/38 |
| 2018/0053253 A1 | 2/2018 | Gokhale et al. |

(Continued)

OTHER PUBLICATIONS

"3 Ways to Sell Your Suppliers on Credit Card Payments", Silicon Valley Bank, Retreived from internet URL: https://www.svb.com/blogs/leigh-moore/3-ways-to-sell-your-suppliers-on-credit-card-payments, (Feb. 16, 2017), pp. 1-5.

(Continued)

*Primary Examiner* — Hao Fu
(74) *Attorney, Agent, or Firm* — Polsinelli PC

(57) ABSTRACT

In some examples, a system may determine a date on which a balance of a user account is expected to fall below a threshold based on analyzing at least one of: the balance of the user account over time, or historical transactions of the user over time. The system may determine an amount for an item purchased, or intended to be purchased, by the user, and may cause the user computing device to present, prior to the date, a suggestion to request financing for the item. In response to a request to finance the item, the system may cause the user computing device to present a graphical user interface (GUI) that includes offers for financing. The system may receive, from the user computing device, via the GUI, a selection of a first offer, and may send an instruction to cause a transfer of funds to the user account.

20 Claims, 11 Drawing Sheets

(56) References Cited

U.S. PATENT DOCUMENTS

2020/0357051 A1\* 11/2020 Hunt .................. G06Q 20/20
2021/0049683 A1\* 2/2021 Jones .................. G06Q 20/26

OTHER PUBLICATIONS

Non-Final Office Action mailed Sep. 9, 2020, for U.S. Appl. No. 16/935,831, of Reses, J., filed Jul. 22, 2020.
Final Office Action mailed Dec. 17, 2020, for U.S. Appl. No. 16/935,831, of Reses, J., filed Jul. 22, 2020.
Advisory Action mailed Feb. 26, 2021, for U.S. Appl. No. 16/935,831, of Reses, J., filed Jul. 22, 2020.
Notice of Allowance mailed Jul. 12, 2021, for U.S. Appl. No. 16/935,831, of Reses, J., filed Jul. 22, 2020.
Corrected Notice of Allowability mailed Jul. 22, 2021, for U.S. Appl. No. 16/935,831, of Reses, J., filed Jul. 22, 2020.

\* cited by examiner

INTELLIGENT ITEM FINANCING

CROSS-REFERENCE TO RELATED APPLICATION

This application is a continuation of, and claims priority to, U.S. patent application Ser. No. 16/935,831, filed Jul. 22, 2020, issued as U.S. Pat. No. 11,170,438, and which is incorporated by reference herein.

BACKGROUND

In some instances, the nature of merchant businesses results in varying merchant-account balances over the course of a year or other time period. For example, one merchant may be relatively busy during the summer season and relatively slow during the winter season, while another merchant may be busy during the winter but not the summer. Therefore, each merchant may experience varying times of capital need, as well as times of having more capital than needed to carry out their respective business operations. Similarly, non-merchant users may experience varying cash flows, due to the periodic nature of expenses and income.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
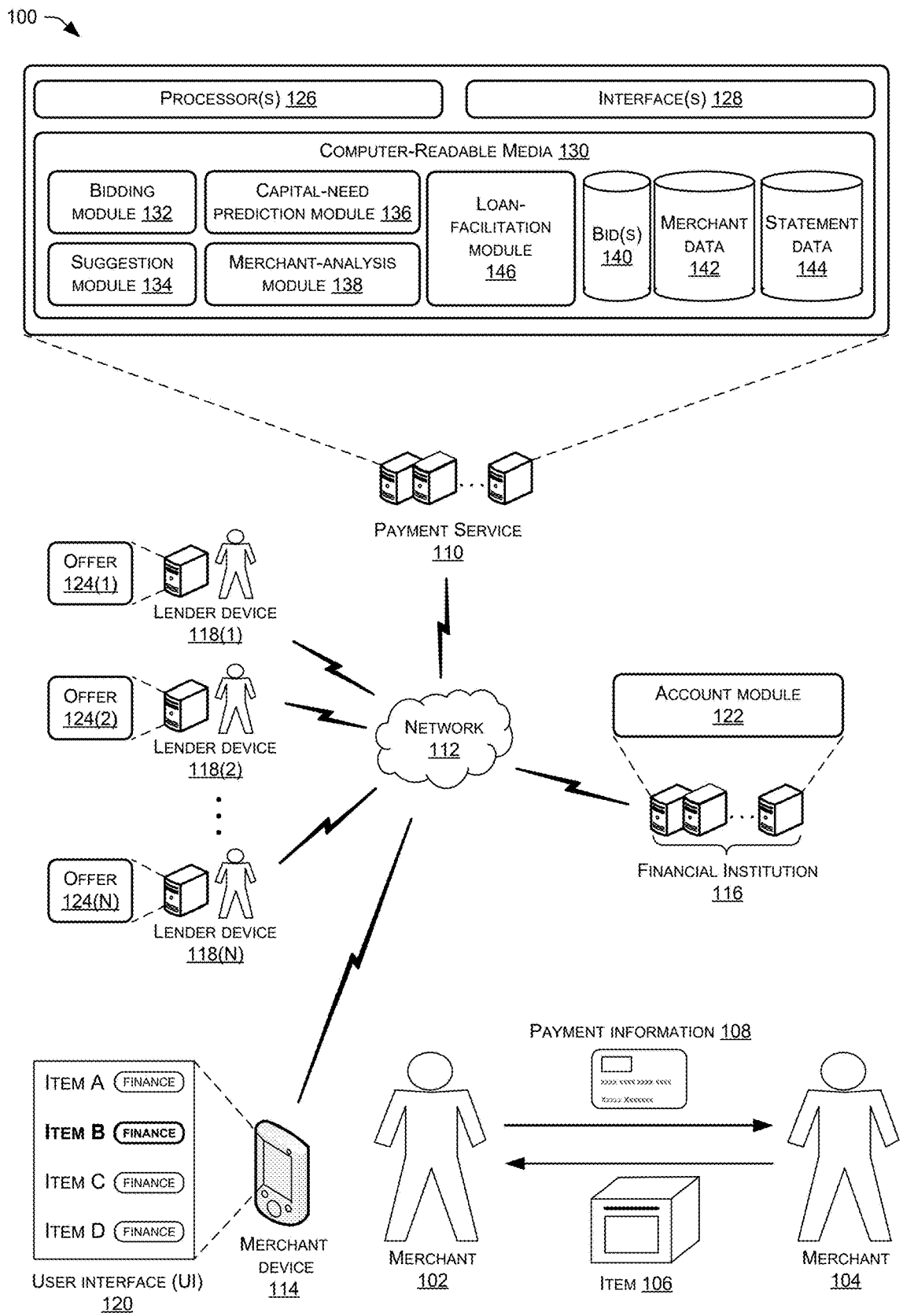
FIG. 1 illustrates an example environment in which a user purchases an item for their business, pays for the item using a financial instrument, and thereafter solicits bids from other lenders to finance the cost of the item and, potentially, other items purchased using the financial instrument.

A merchant sees varying cash flow throughout the year based on an array of factors, such as a seasonality of a respective merchant's business, the presence (or lack thereof) of events local to the respective merchant, the fluctuation of payments made to or from the merchant to vendors or suppliers, changing financial or economic landscape, and/or the like. As such, at certain times a merchant or other user may need capital to adapt their business in accordance with the market changes.

This disclosure describes, in part, techniques for enabling a merchant to obtain capital for the cost of individual items after the merchant has acquired the item(s) using a financial instrument, such as a credit card, debit card, or the like. For example, a merchant may purchase, through the course of a month, multiple items using a credit card provided by a financial institution. These items may comprise inventory, equipment, or any other type of item for operating the business of the merchant. At the end of the month, the financial institution may provide a statement to the merchant indicating and requesting payment of the total cost of the items purchased. The statement here refers to an output data resulting from aggregating, or in some cases, de-aggregating, purchases made by the merchant. The statement may detail purchases made by the merchant over a predefined amount of time (e.g., a month) and details regarding those purchases. The statement may also be generated from specific clusters of purchases (e.g., cluster all grocery purchases, all raw material purchases, all technology subscriptions and licenses, and so forth) and/or credit risks associated with each item (e.g., all purchases with high credit risk regardless of month of purchase or dollar value, all purchases with low credit risk, etc.). In another example, the statement can be generated based on volume or transaction amounts.

After, or prior to, paying some or all of this cost to the financial institution, however, the merchant may request to a loan finance the cost of remaining cost. For example, the merchant using a merchant device may send a request to a service provider that aggregates purchases made by the merchant using the credit card and that enables the merchant to select individual items to finance via one or more other lenders. In some instances, the service provider that enables this functionality may be a financial institution associated with the credit card itself. In other instances, the service provider may be a payment service that processes payment transactions between merchants and customers and, thus, may store information regarding the merchant that may be helpful in making certain suggestions to the merchant, as described in detail below.

As described in detail below, this service provider may present a user interface (UI) on the merchant device that enables the merchant to view individual items purchased by the merchant and to select one or more individual items for financing. For example, this information may comprise, or be similar to, the statement generated by the financial institution or service provider, coupled with functionality for requesting to generate financing options, such as bids, to finance one or more items. This is to say, the UI may indicate the items acquired by the merchant within the past month (or other time period), along with information regarding this purchase, such as the date of the purchase, the cost of the purchase, the identity of the merchant who sold the item, and the like. In addition, this UI may include functionality, such as respective icons, to enable the merchant to request to finance one or more of the listed items. For example, envision that a merchant who operates a small pizza restaurant has purchased, within the last month, flour, cheese, pepperoni, and a new pizza oven. The UI may indicate these purchases and may include the functionality to enable the merchant to pay for the flour, cheese and pepperoni but request a loan to finance the cost of the new pizza oven. In this fashion, the merchant has the flexibility to manage their cash flow by obtaining financing on a line-item basis.

In the example above, upon the merchant selecting the pizza oven, the service provider may automatically select a lender from available lenders. The service provider may do so based on predictive analytics, such as the last lender to have serviced the merchant, historical data to indicate the lender most likely to service the merchant, and so on.

Alternatively, the service provider can receive an indication of selection of the pizza oven and, in response, may solicit one or more loan offers for this financing from one or more lenders. As part of the solicitation, the merchant may set preferences or threshold for the financing terms that the merchant expects. For example, the service provider may send, to respective lender computing devices, an indication of the request to finance the cost of the pizza oven, along with pertinent information regarding the item, the item, the purchase, the merchant, and/or the like. For example, the service provider may send, to the lender computing devices, information regarding a cost of the item, the identity and specifications of the item, a date of the purchase, an identity of the seller of the item, prior payment history of the merchant, prior purchases of the merchant, credit risk score associated with the merchant, and/or the like. Using this information, each lender may generate a respective loan offer for providing a loan to the merchant to cover the cost of the item. For instance, a first lender may generate a loan offer indicating that they will finance the cost of the pizza oven, while requiring that the merchant pay back the cost of the pizza oven of twelve months with a 3% interest rate. A second lender, meanwhile, may generate another loan offer indicating they will finance the cost of the pizza oven, while asking the merchant to pay a larger sum of money three months after the time of the loan and, thereafter, paying the balance off over twenty-four months with a 4% interest rate. In some instances, each lender may generate the respective loan offer based on a perceived level of risk, which may be based on the item and on information regarding the merchant. Further, each lender may generate the offer based on the desirability of providing the loan for the given lender. For example, while some lenders may choose to pursue providing loans for capital equipment, others may choose to more heavily purse loans for inventory items. Some lenders may offer loans based on historical association and familiarity with the merchant or merchants with similar business model.

Furthermore, in some instances each lender may generate their respective loan offer without viewing terms associated with other loan offers from other lenders. That is, each lender may submit their loan offer in a manner that is not viewable by other lenders. The merchant may then choose their preferred offer. In other instances, meanwhile, the lender offers may be viewable by each lender, such that the lenders may view other offers and, if desired, attempt to "outbid" other lenders by providing more desirable terms. In this manner, the techniques described herein may enable the lenders to compete with one another with respect to receiving the opportunity to provide the loan to the merchant. In some instances, the lenders may update their lending terms as part of this bidding process.

After receiving the respective loan offers from the lenders, the service provider may generate another UI and present this UI on the merchant device. The UI may indicate the different offers to finance the pizza oven, such as the example offers noted above, and may include functionality to enable the merchant to select the an offer from those options. In some cases, the service provider can filter or prioritize/rank the loan offers based on merchant preferences, merchant threshold or probability to accept the offer, trends with respect to similar merchant and what they are accepting, etc. That is, the UI may include icon(s) or other functionality to enable the merchant to select the desired offer. After making this selection, the service provider may receive an indication of the selection and may, in some instances, facilitate the loan between the lender associated with the selected offer and the merchant. Thus, the merchant may receive needed capital through the financing of the individual item. Further, the techniques provide flexibility to the merchant to select individual items to finance and to receive varying loan offers for the items.

In some instances, the service provider may provide certain suggestions to the merchant. For example, in some instances the service provider may have insight into the business of the merchant (or similar merchants) and, thus, may use this insight to suggest items to finance, loan offers to accept, and/or the like. For example, and as noted above, the service provider may process payment transactions between the merchant and customers of the merchant and, thus, may be aware of the timing of revenue received by the merchant, as well as the outflow of cash of the merchant. The service provider may use this information to determine when the merchant is likely to need additional capital. For example, the service provider may analyze historical data associated with the merchant to determine that the merchant is likely to need capital during a particular month. Thus, the service provider may suggest, to the merchant, that the merchant finance the cost of one or more items prior to the given month. Further, given that the service provider may be aware of the amount of the needed capital, the service provider may suggest one or more items to finance (e.g., based on the cost of the item(s)). In some instances, the merchant may select a minimum balance associated with their account, and the service provider may utilize the historical data and the described financing suggestions to attempt to avoid the balance falling below this minimum balance.

In addition, given that the service provider may communicate with both the merchant and potential lenders, the service provider may store information regarding the lenders over time. This information may include the types of items each respective lender typically finances, their typical terms, the cost of items they finance, and the like. The service provider may use this information to select which lenders to solicit loan offers from and/or to suggest to the merchant which lender to consider working with.

In some examples described below, the service provider generates predictive models based on past transaction data and/or future-event data to predict when a merchant or user account is expected to dip below a minimum balance associated with that merchant or user. Further, and as introduced above, the described techniques may also determine, in response to identifying that an account balance is expected to dip below a minimum balance, one or more items to finance and a time at which to do so to avoid this scenario.

To generate these predictive models, the techniques may begin by aggregating historical data associated with an example merchant or user, historical data associated with similarly situated merchants or users, and/or the like. For example, the techniques may aggregate historical transaction data indicating payments into a merchant account and payments out of the merchant account over time, payments into and out of a personal account of a user, and/or the like. The historical transaction data may indicate, for instance, payments made by customers into the merchant account, payments made by the merchant to vendors or suppliers, payments made by a user to a merchant or another user, and/or any other type of movement of funds into and/or out of the merchant or user account. The historical transaction data may also indicate data, such as transaction data, cash flow data, and payment data, from similar merchants (similar merchant type, merchant in similar locations, and so on). In addition, the techniques may aggregate historical account-balance information indicating a balance of the merchant or user account as the balance has varied over time. That is, the historical account-balance information may indicate how the balance of the merchant or user account (or accounts) has fluctuated over the course of days, weeks, months, seasons, years, or the like. In some information, this information may indicate seasons or events that affect the business of the merchant or seasons or events that affect cash flow and/or a balance of a user account. In some implementations, the information may be filtered in a variety of ways, e.g., the cash flow can indicate the historical data and/or minimum balance for a specific item, use-case, merchant location, and so on.

In some instances, the techniques described herein may be used to determine a minimum balance that the merchant or user account is to maintain. For example, the minimum balance may be determined by analyzing the historical transaction data to determine the size and timing of payments made into and out of the account and determining a balance that the account should keep to ensure that any reasonably anticipated payment out of the account would not cause disruption to the business of the merchant or to cash-flow needs of a user. In some instances, the minimum balance may change over the course of a year or other time periods, while in other instances it may remain constant. Further, in some instances the minimum balance may be determined using one or more of the predictive models described below. In addition, it is noted that a minimum balance may be unique to a merchant or user or may be unique to a category of merchants or users. Further, in some instances a merchant or user may set the minimum balance for the corresponding account. In some instances, predicting when a merchant account may fall below the minimum balance may comprise predicting when the merchant account may fall below the minimum balance for a threshold amount of time.

In some instances, the techniques described herein may also identify similarly situated merchants or users as the example merchant or user and may aggregate the described historical data for these similar merchants. In instances of merchants, the similar merchants may include merchants having a similar business (e.g., the same or a similar merchant category code (MCC)), merchants within a threshold geographic proximity to the example merchant, merchants having a similar sales volume as the example merchant, and/or the like. In terms of users, the similar users may include those users associated with similar demographic data, those users with similar historical data indicating inflow and outflow of funds from their accounts, and/or the like.

After aggregating this historical data associated with the example merchant/user and/or the similar merchants/users, the techniques may train one or more predictive models using the historical data. The predictive models may comprise neural networks, support vector machines, and/or any other type of trained classifier. In some instances, after generating the model, the model may be used to determine whether the merchant account is predicted to dip below the minimum balance and, if so, a time at which the account is predicted to do so.

In response to identifying a time at which the account is predicted to dip below the minimum balance, the techniques may suggest that the merchant or other user finance the cost of one or more items, such as the cost of the pizza oven as described above. Furthermore, in some instances, the techniques may suggest that the merchant or other user finance the cost of one or more items in response to one or more triggers other than a prediction that the account balance is going to dip below a minimum balance. For example, the described service provider may make this suggestion in response to a balance differing by a threshold amount (up or down) from a threshold balance, in response to a sudden inflow or outflow of cash, or the like.

The techniques described herein thus provide an efficient and tailored solution to the problem of providing capital to merchants and/or users in need of capital. For example, rather than offer loans in a generic, one-size-fits-all manner, the described techniques tailor the item being finance, the size of the loan, the identity of the lender, and the lending terms to the needs of the merchant and desires and strengths of the lender. For example, in some instances the service provider described herein comprises a payment-processing service that processes payments made by merchants to their vendors over time. Thus, the payment-processing service may store historical data associated with these purchases and may use this information to determine future cashflow needs of these merchants. This information may be used to provide potential lenders with data that is customized to each merchant to enable the lenders to meet the unique needs of each merchant. Thus, the payment-processing service may serve as an effective intermediary between merchants and prospective lenders and may use historical data to help effectuate loans between merchants and lenders that are customized to the merchant needs. Further, as the payment-processing service interacts with merchants and lenders over time, the service may determine which lenders are most appropriate for which merchants, thus facilitating effective loans between merchants and lenders. In addition, given that the techniques enable merchants to finance individual items, the payment-processing service enables merchants to use a single payment instrument, while receiving multiple loans from multiple lenders on individual items initially purchased using the single payment instrument.

Furthermore, predictive management of account balances by the payment-processing service described herein provides technological advancements over prior systems. For instance, real-time and predictive generation of loan amounts for user accounts may reduce the number of network interface calls needed for capital funding when compared to prior systems where users must submit an application request for credit to a banking server, submit the completed application over the network, submit another signal to indicate that they have accepted the loan, and then finally the funds are transferred to the user's account. Moreover, and in accordance with at least one example, the payment service system intelligently generates the optimum amount of capital needed by the user for a given time period based on a user's transaction history on the payment service and can proactively provide the necessary funds prior to the user submitting a request over the network. Additionally, the payment service can perform immediate risk assessment and capital underwriting functionality without the payment service having to submit data requests over the network to a third-party credit reporting entity. Accordingly, examples of the present disclosure are able to reduce the computational burden and network congestion that can arise from a multitude of loan funding requests being received at a payment service system concurrently or in quick succession. That is, example embodiments disclosed herein provide technical advantages over prior solutions by reducing network traffic and improving network bandwidth for account management systems.

Even though the examples here describe merchant debt and a merchant interacting with lending systems for lending offers, the methods and systems described herein can be implemented for any kind of consumer debt, and for allowing consumers of a payment service system, or other consumers interacting with the payment service system via an API/SDK, to interact with lending systems, to allow such consumers to obtain lending offers on a line-item basis. Similar to the merchant-lender relationship described here, the payment service system can also de-aggregate the traditional monthly payment commitments into one or more financeable units, e.g., balance-management-friendly units, and layer another offer on new or favorable terms, in addition to the one on the entire monthly or other timed statement. In one example, the payment service system can cluster purchase types (e.g., all grocery purchases, all raw material purchases, all technology subscriptions and licenses, etc.) and re-finance those in updated or favorable terms or customer-manageable term options. In another example, the payment service system may cluster items based on associated risks and, as such, de-aggregates the less risky purchases from the risky ones and offer better repayment terms on at least a portion of the items. In another example, the payment service system can de-cluster based on volume or transaction amounts.

Additional technical improvements are described below in the discussion of FIGS. 1-9. It is to be appreciated that while these examples are described with reference to merchants and merchant accounts, the techniques apply equally to other types of user accounts (e.g., personal checking accounts, personal savings accounts, etc.) as discussed above.

FIG. 1 illustrates an example environment 100 for performing techniques described herein. The example environment 100 includes one or more merchants, such as example merchants 102 and 104. Each of these merchants may conduct transactions with customers and, in some instances, with one another. For example, FIG. 1 illustrates that the merchant 102 may purchase an item 106 by providing payment information 108 to the merchant 104.

In some instances, each merchant operates a respective merchant device configured as a point-of-sale (POS) device for conducting transactions with customers. In some instances, each respective merchant device interacts with a payment service 110 over a network 112, with the payment service 110 processing payments for the transactions between the customers and the merchant. For example, the merchant 102 may be associated with a merchant device 114, which the merchant 102 may use as a POS device for engaging in payment transactions with customers. While not illustrated, the merchant 104 may also utilize a merchant device configured as a POS device for engaging in transactions, such as the transaction illustrated in FIG. 1.

The network 112, meanwhile, may represent any combination of wired and/or wireless networks. Furthermore, as described herein, a "merchant" can be any entity that offers items (e.g., goods or services) for purchase or other means of acquisition (e.g., rent, borrow, barter, etc.). The merchant can offer items for purchase or other means of acquisition via brick-and-mortar stores, mobile stores (e.g., pop-up shops, food trucks, etc.), online stores ("ecommerce"), combinations of the foregoing, and so forth. In case of a peer-to-peer (P2P) scenario, the merchant and customer can be a first P2P customer and a second P2P customer, respectively, capable of transferring money to each other via a P2P payment application. In some instances, the merchant may also comprise a consumer that purchases one or more items (e.g., using a mobile payment application) and uses the techniques described herein to finance these items on an individual basis.

Returning the illustrated example, the merchant 102 may purchase, from the merchant 102, the item 106, which may be an item for use in a business of the merchant. FIG. 1, for instance, continues the example from above and illustrates that the item 106 may be a pizza oven for use in a pizza restaurant of the merchant 102. In addition, FIG. 1 illustrates that the merchant 102 may pay for the item 106 using payment information 108, which may comprise credit-card information, debit-card information, stored-value-card information, and/or the like. The payment information 108 can also be consolidated information obtained from a variety of payment instruments associated with the merchant or for which the merchants provides access. In some instances, the payment information 108 comprises information associated with a credit card that is associated with a financial institution 116 (e.g., a bank, a lending institution, a payment service 110). That is, the merchant 102 may have a line of credit with the financial institution 116, such that the financial institution 116 provides funds to the merchant 104 upon the merchant 102 purchasing the item from the merchant 104.

Sometime after the merchant 102 purchases the item 106, the merchant 102 may choose to finance the cost of the item using one or more additional lenders. For example, in some instances, the merchant 102 may pay the financial institution 116 for the cost of the item 106 and then may thereafter seek to finance the cost of the item in order to free up additional cashflow. For example, the merchant 102 may pay some or all of a cost of a monthly credit-card statement to the financial institution 116 and may thereafter seek to finance the cost of the item 106 and/or one or more other items. In other instances, meanwhile, the merchant 102 may seek to finance the item 106 prior to paying the financial institution for the cost of the item 106 and/or other items purchased using the credit card. Even though the example here uses credit card, it will be understood that other kind of instruments, such as cheques, debit cards, cash, P2P instruments, can also be used.

In this regard, the merchant 102 may interact with the payment service 110 to request to receive one or more offers to finance the item 106 and/or one or more other items. For example, the payment service 110 may act as an intermediary between the merchant 102 requesting to finance one or more individual items, such as the item 116, and one or more lenders, each of which are illustrated as being associated with a respective lender device 118(1), 118(2), . . . , 118(N).

In some instances, the merchant 102 may operate the merchant device 114 to request that the payment service 110 provide a user interface (UI) 120 to enable the merchant 102 to request to finance one or more individual items. In response to receiving such a request, the payment service 110 may retrieve information regarding purchases recently made by the merchant 102 using one or more financial instruments of the merchant 102, such as the credit card provided by the financial institution 116. For example, the payment service 110 may issue a request to the financial institution 116 for information regarding a current and/or historical statements associated with the credit-card account of the merchant 102 maintained at the financial institution 116. The statement can be timed, such as monthly or quarterly. In another example, the statement can be generated based on specific pre-configured rules. Such rules may dictate how the payment service 110 de-aggregates the traditional monthly payment commitments into one or more financeable units, e.g., balance-management-friendly units. In one example, the payment service 110 can cluster purchase types (e.g., all grocery purchases, all raw material purchases, all technology subscriptions and licenses, etc.). In another example, the payment service system can even items based on associated risks and as such de-aggregates the less risky purchases from the risky ones and offer better repayment terms at least a portion of the items. In another example, the payment service system can de-cluster based on volume or transaction amounts. In some instances, the merchant 102 may provide authentication information to enable the financial institution 116 to provide this information, which an account module 122 of the financial institution 116 may maintain, to the payment service 110 or to provide this information directly to the merchant device 114. In some instances, the payment service 110 may aggregate this information from multiple different financial institutions that are associated with financial instruments of the merchant 102. Further, in instances where the payment service 110 processes payment transactions for the merchant 102, the payment service 110 may store this information and, thus, might not request it from the financial institutions. It is also be appreciated that the payment service 110 may provide a financial instrument to the merchant 102 and, thus, the statement information may include purchases made by the merchant 102 using the financial instrument provided by the payment service 110. Thus, it is to be appreciated that the payment service 110 may aggregate statement information indicating recent purchases made by the merchant 102 using one or more financial instruments provided by the financial institution(s), the payment service 110, and/or a combination thereof. The payment service 110 may apply specific rules to aggregate the information, e.g., the payment service 110 may filter the information to include items purchased by the merchant for the merchant business.

After retrieving this statement information, the payment service 110 may present a UI 120 on the merchant device 114 indicating the recent or filtered purchases and including functionality to enable the merchant 102 to request to finance one or more of these purchases. As illustrated, for instance, the UI 120 illustrates four recent purchases made by the merchant 102 (Items A, B, C, and D) and, adjacent each indicated item, a respective icon (entitled "finance") that, when selected, sends a request to finance the item or solicit one or more loan offers to finance the item to the payment service 110. That is, the UI 120 may comprise a credit-card statement, a combination items from multiple credit card statements, or any other listing of items that the merchant 102 has currently purchased using one or more financial instruments, such as the financial instrument associated with the payment information 108. In addition, the UI 120 includes functionality to request to solicit one or more loan offers for financing individual items. In this example, the functionality comprises one or more icons, although any other type of command elements (e.g., drop-down box, radio buttons, etc.) may be used to receive the request from the merchant 102 to solicit the one or more offers. Further, it is to be appreciated that while the illustrated example describes recent purchases, in other instances the merchant may choose to solicit loan offers on other items regardless of the date of purchase. For example, the merchant may choose to filter items based on their cost, category, or in any other manner.

In this instance, the merchant 102 requests to finance the individual "item B", which corresponds to the item 116 in the current example. That is, the merchant 102 may utilize the UI 120 to request to receive offers to finance the individual pizza oven apart from the other items that may have been purchased using the same payment information 108. In some instances, the merchant 102 may have already paid the financial institution 116 for these items (including the item 106), while in other instances, such payment may still be pending.

Upon receiving this request, the payment service 110 may solicit one or more lending offers on behalf of the merchant 102. That is, the payment service may send information regarding the request for financing to one or more lender devices 118(1)-118(N). In some instances, this information comprises information regarding the item (e.g., item cost, item type, etc.), the merchant 102 (e.g. prior payment history, prior purchases, pending purchases, merchant type, location, size, etc.), the merchant 104 (e.g., merchant type, location, size, etc.) and/or any other information that a lender may use in determining whether to generate a lending offer and/or in determining the contents of any such offer. In some instances, the payment service 110 may already have lender preferences or offers stored that the payment service can use to predictively match a merchant with one or more lenders without merchant or lender intervention or explicit request.

FIG. 1, for instance, illustrates that each of the lenders may generate a corresponding lending offer 124(1), (2), . . . , (N) and the lender devices 118(1)-(N) may provide the respective offers to the payment service 110. Upon receiving these offers 124(1)-(N), the payment service 110 may generate another UI indicating the offers and may send this UI to the merchant device. In addition to indicating the respective offers, the UI may also include functionality to enable the merchant 102 to select one of the offers. Upon the merchant 102 selecting an offer, the payment service 110 may receive an indication of this selection and may, in some instances, facilitate the loan between the merchant 102 and the lender associated with the selected loan offer. For example, the payment service 110 may send an indication of the selection to the appropriate lender device, may create a secure communication channel or session to be established between the merchant device and the lender device, and facilitate transfer of funds from an account of the lender to an account of the merchant 102, and so forth. The secure communication channel is further customized based on the characteristics of the lender device and the merchant device and account data structures. In some cases, the communication channel passes through the payment service 110 to ensure data and security compliance between the merchant and the lender. Furthermore, the payment service 110 can facilitate this communication session through specific API calls made to the lender platform and the merchant platform, such that neither of the two have to configure their platforms for such communication.

As illustrated, the payment service 110 may comprise one or more server computing devices comprising modules such as one or more processors 126, one or more interfaces (e.g., network interfaces) 128, and computer-readable media 130. The computer-readable media may include a bidding module 132, a suggestion module 134, a capital-need prediction module 136, a merchant-analysis module 138, and a loan-facilitation module 146. In addition, the media 130 may include a datastore 140 storing bid information received from lender devices 118 (e.g., lending terms), a datastore 142 storing merchant data (e.g., transaction history, payment history, merchant type, location, etc.), and a datastore 114 storing statement information (e.g., as received from one or more financial institutions, such as financial institution 116). In addition, while FIG. 1 illustrates the payment service 110 storing these datastores, in some instances the payment service 110 may acquire some or all of the underlying data from one or more third-party (3P) services. For example, the 3P services may comprise banks or other financial institutions storing information associated with merchant or user accounts. In these instances, the payment service 110 may access the information via API calls or the like over the network 112 with express consent/request of the merchants or other users.

The bidding module 132 may be configured to generate data for soliciting one or more bids, or "loan offers", in response to a user, such as the merchant 102, requesting these bids. For instance, upon the merchant 102 using the UI 120 to request to receive financing for the item 106, the bidding module 132 may generate and send data to the lender devices 118 to inform the respective lenders of the request and to enable the lenders to determine whether to generate an offer and, if so, the contents of the offer. For example, the bidding module 132 may send, to the lender devices, an indication of the request to finance the item, along with information regarding the item, merchant data of the merchant 102 stored in the datastore 142, statement data associated with a current or past financial-instrument(s) of the merchant 102 stored in the datastore 144, and/or the like. As noted above, this statement data may be received by the payment service from one or more financial institutions, such as the financial institution 116, or may be sent to the lender devices 118 directly from the institutions at the express consent of the merchant 102. The lenders associated with the lender device 118 may then decide whether to generate a lending offer and, if so, may send the offers back to the bidding module 132, which may store the respective lending offers in the datastore 140.

Upon receiving one or more lending offers, or "bids", the bidding module 132, or another module of the payment service 110, may generate another UI indicating the different offers and may send this UI to the merchant device 114. Upon the merchant 102 selecting a particular offer, the payment service 110 may receive an indication of the selection and, in some instances, may facilitate the loan.

In some instances, meanwhile, the suggestion module 134 of the payment service 110 may generate one or more suggestions for presentation to the merchant 102 and/or to the lenders associated with the lender devices. For example, the suggestion module 134 may recommend that the merchant finance one or more particular items, finance item(s) at a particular time, work with particular lender(s) that may be most beneficial for the merchant 102, accept certain lending offers that are most beneficial for the merchant 102 or similar merchants, and/or the like.

For example, the merchant-analysis module 138 may analyze past expenses and incoming revenue to generate information indicative of a balance of an account of the merchant over time. The merchant-analysis module 138 may also factor in expenses and revenue of similar merchants determined based on, for example, merchant type, geographical location, inventory, and so on. The capital-need-prediction module 136, meanwhile, may use this information to determine when the merchant 102 is likely to need additional funds. For example, the capital-need-prediction module 136 may comprise one or more machine-learning models that receive this type of data (e.g., historical expenses, historical revenues, merchant types, geographical location, inventory, time of year, etc.) to determine if and when a merchant is likely to need these additional funds. To generate these models, these machine-learning models may analyze training data to train a data model that generates an output, which can be a recommendation, a score, and/or another indication. Machine-learning models can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, and the like.

Figure 3:
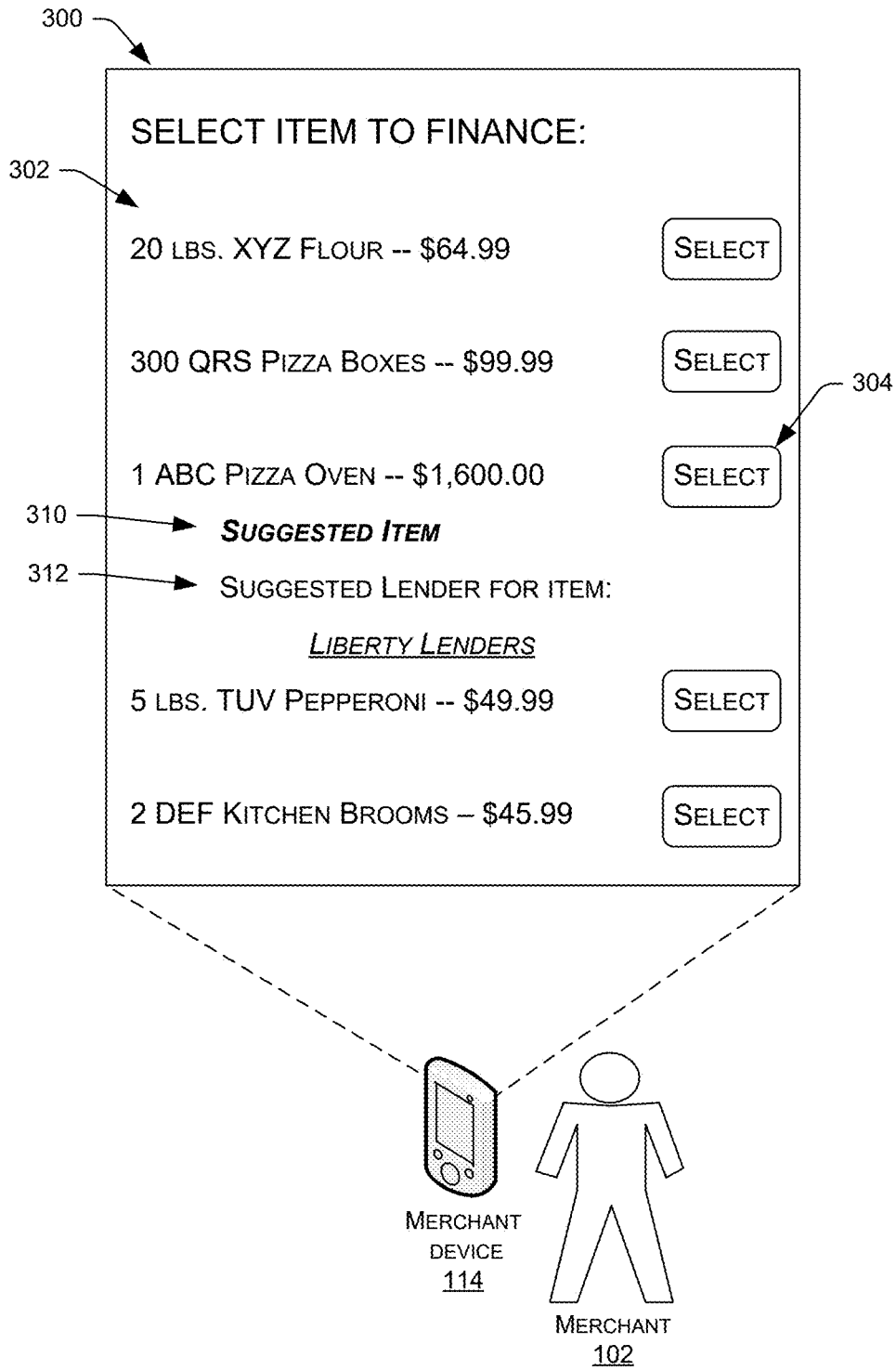
FIG. 3 illustrates an example user interface (UI) that the payment service of FIG. 1 may present on a device of the user to enable the user to request lending offers for financing individual items previously purchased using a financial instrument.
Figure 4:
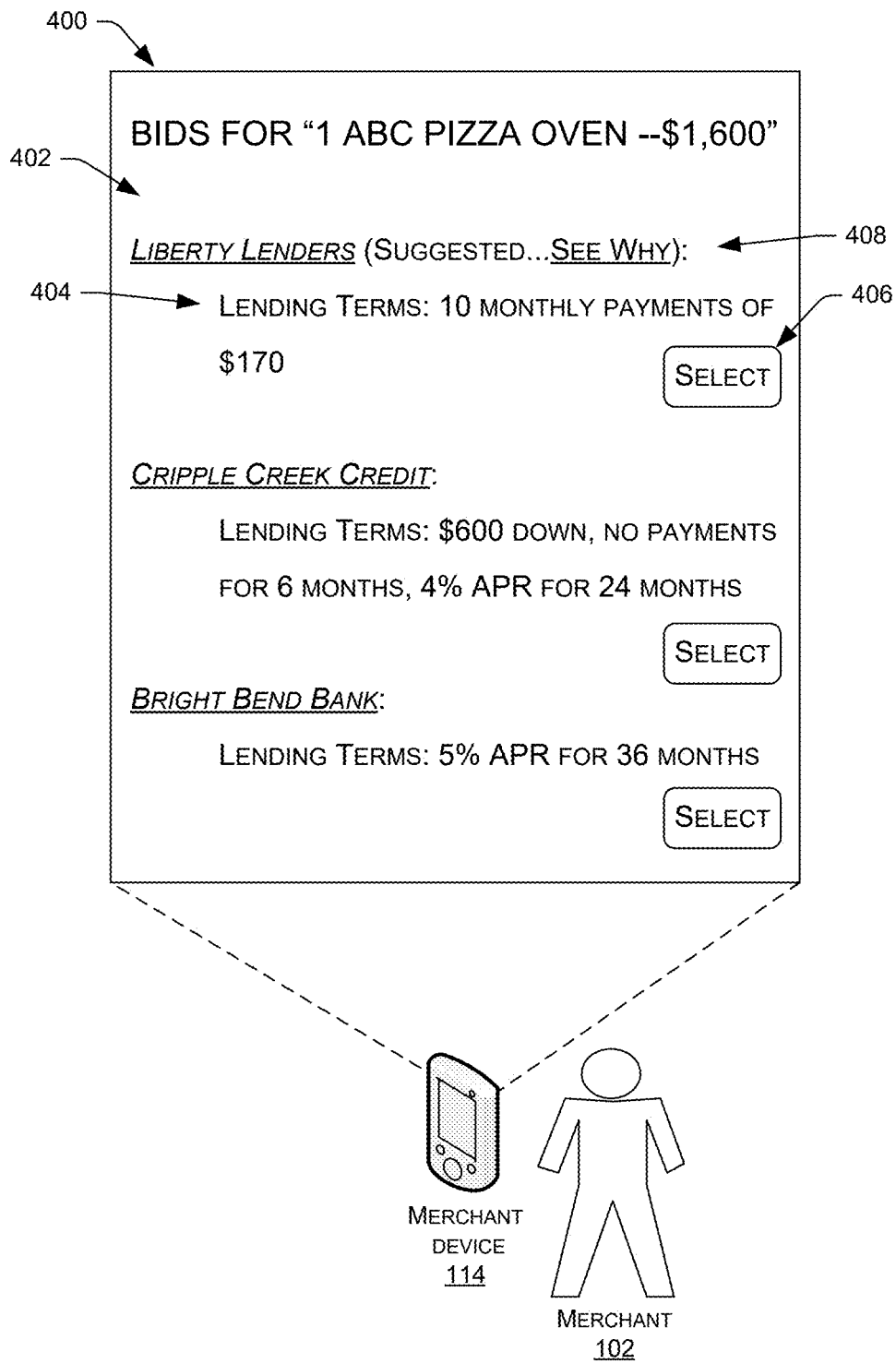
FIG. 4 illustrates another example UI that the payment service of FIG. 1 may present on the merchant device in response to the merchant requesting to finance the cost of a particular item.
Figure 5:
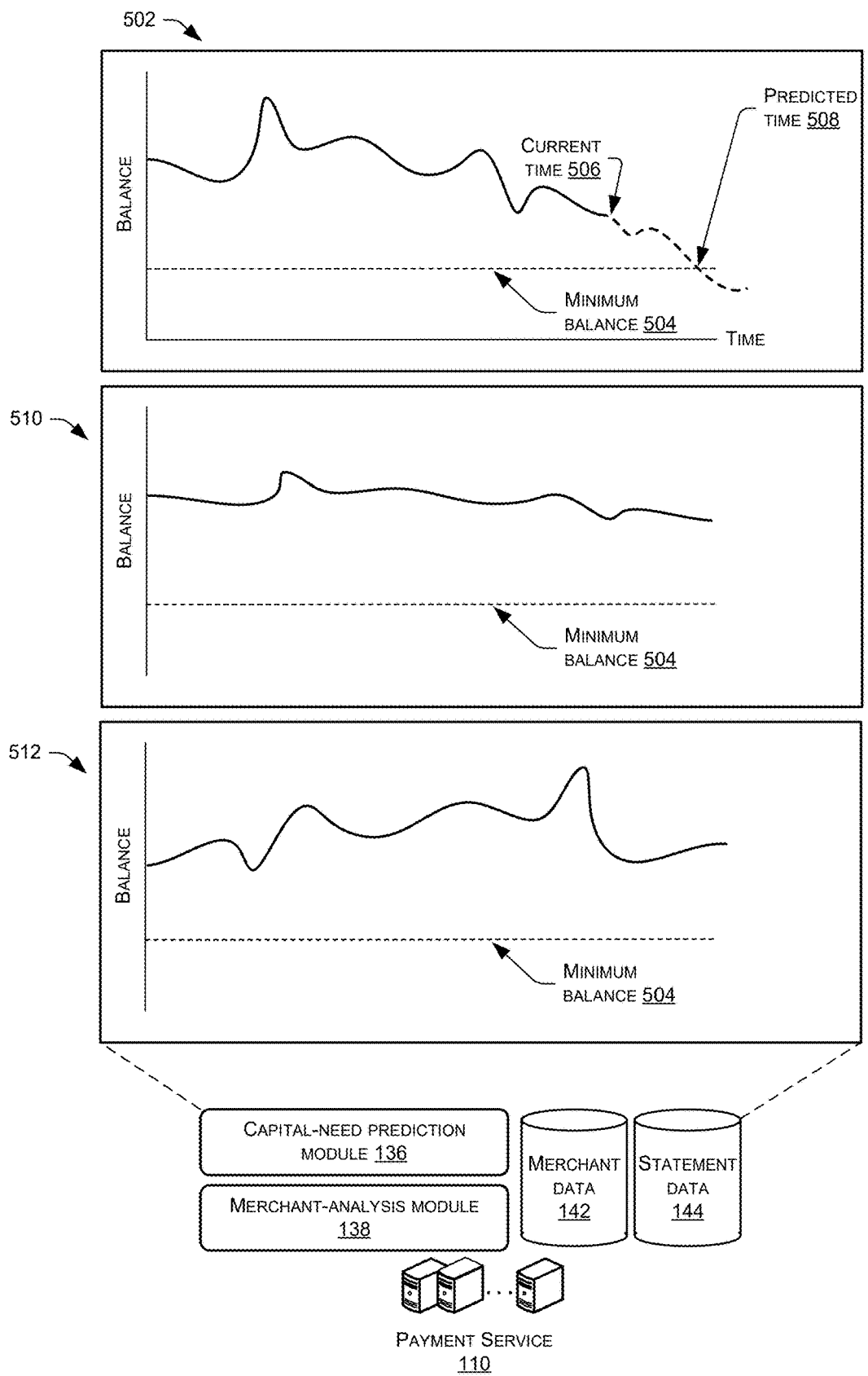
FIG. 5 illustrates example operation of a capital-need prediction module of the payment service of FIG. 1.

Some or all of this information may be provided to the suggestion module 134, which may determine one or more suggestions to make to the merchant 102. For example, based on the expected amount of capital needed by the merchant 102, the suggestion module 134 may suggest that the merchant consider financing one or more items that collectively have a cost approximately equal to the expected amount of capital. In addition, or in the alternative, the suggestion module 134 may suggest that the merchant 102 request to finance an item that is likely to generate interest among multiple potential lenders based on past requests by other users regarding similar items. In another example, the suggestion module 134 may suggest that the merchant 102 work with a particular lender that has experience lending in a line-of-business similar to that of the merchant 102 and/or that has provided good lending terms for similar items in the past. In still other instances, the suggestion module 134 may suggest that the merchant 102 accept a certain lending offer that is best suited for impending cashflow needs of the merchant 102. FIGS. 3 and 4 provide examples of such suggestions. FIGS. 5 and 6 discuss example operation of the capital-need-prediction module 136.

Upon the merchant 102 selecting one of the loan offers, the loan-facilitation module 146 may facilitate the respective loan between the merchant 102 and the lender associated with the selected loan offer. Facilitating the loan may include compiling the needed information from the merchant 102 and providing it to the lender, generating a communication channel between the merchant and the lender, or the like. Upon the lender and the merchant 102 finalizing contractual terms of the loan, the loan-facilitation module 146 may further enable funds from the lender to be transferred to an account of the merchant. Further, the loan-facilitation module 146 may enable the merchant to repay the loan according to the agreed-upon terms of the loan. Thus, the loan-facilitation module 146 may both solicit and suggest the loan offers, as well as enable the flow of funds to the merchant and payback of the loan over time by the merchant. Specific channels are formed for each offer created between item(s) and the lending system, and such channels are integrated with an overarching channel that exists between the merchant and another lending system that offers credit terms on the entire monthly statement.

Figure 2:
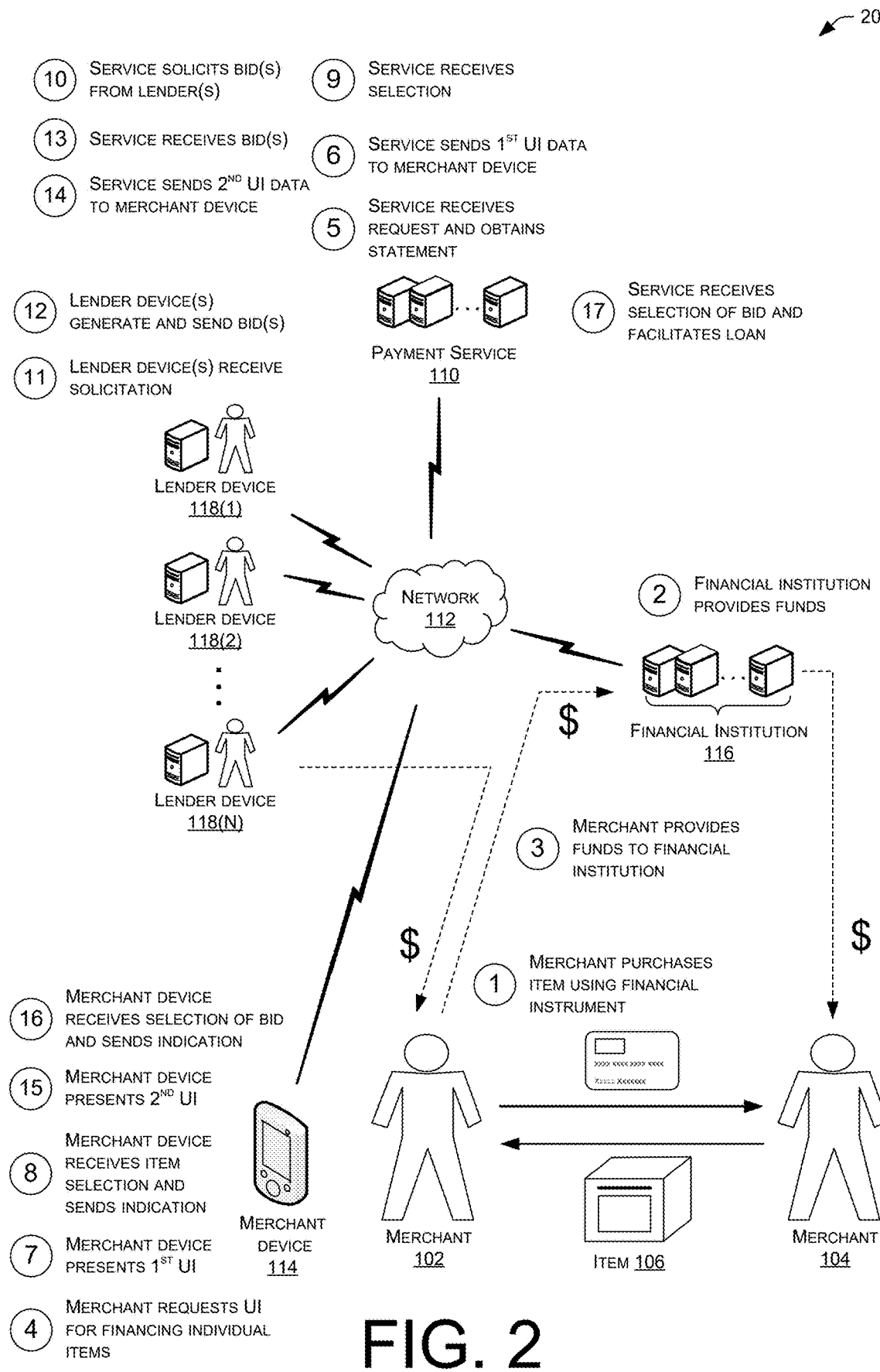
FIG. 2 illustrates an example flow of operations within the environment of FIG. 1. As illustrated, the user may acquire the item using a financial instrument, pay a financial institution associated with the financial instrument for the cost of the item, and thereafter solicit and receive different lending offers to finance the cost of the item.

FIG. 2 illustrates an example flow of operations 200 within the environment of FIG. 1. As illustrated, the merchant may acquire the item of FIG. 1 using a financial instrument, pay a financial institution associated with the financial instrument for the cost of the item, and thereafter solicit and receive different lending offers to finance the cost of the item. Upon the merchant selecting a lending offer, the payment service may facilitate the loan between the merchant and the corresponding lender.

To begin, a first operation "1" represents the merchant 102 purchasing the item 116 from the merchant 104 using the financial instrument 108 of the merchant 102 as part of a financial transaction. In this example, the financial instrument is associated with the financial institution 116. Therefore, in response to the merchant 102 purchasing the item using the financial instrument, at "2" the financial institution 116 provides funds for the cost of the item 106 to an account of the merchant 104. In some instances, the payment service 110 processes this payment transaction.

At an operation "3", the merchant 102 provides funds to the financial institution 116, e.g., to "settle" the financial transaction. For example, the merchant 102 may pay some or all of a monthly statement for the financial instrument to the financial institution 116. In some instances, this monthly statement includes the cost of the item 116. Of course, while this example describes the merchant paying the financial institution 116 prior to financing the item with a different lender, as described below, in other instances these operations may be reversed.

At an operation "4", the merchant requests, from the payment service 110, a UI to enable the merchant 102 to finance individual items. In some implementations, the operation "4" can be initiated by the lender device, e.g., the payment service 110 can notify the lender device of a purchase made by a merchant and if the lender is interested in providing financial offers to the merchant.

The operation "4" can also be automatically triggered by the payment service, without merchant or lender intervention, based on monitoring of the merchant's cash flow and predicting the need for additional cash flow.

At an operation "5", the payment service 110 receives the requests the request and obtains one or more statements. For example, the payment service 110 may obtain statement data associated with an account of the merchant 102 from the financial institution 116. The payment service 110 may run predictive models to determine which items may be of merchant's and/or lender's interest. At an operation "6", the payment service 110 sends the UI for requesting to finance individual items to the merchant device 114. At an operation "7", the merchant device 114 presents the UI and, at an operation "8", the merchant device 114 receives, via the UI, a selection of an item that the merchant 102 would like to finance and sends a corresponding indication to the payment service 110. At an operation "9", the payment service 110 receives the selection.

At an operation "10", the payment service 110 solicits one or more bids from one or more lenders. This operation may include, for example, the payment service 110 sending information regarding the item 116 and/or the merchant 102 to lender devices 118 to enable corresponding lenders to evaluate the risk of the proposed loan and to generate lending terms (if desired). In some embodiments, the payment service 110 may itself determine the "best offer" from each lender based on machine-learning models that use inputs such as historical offers, current market conditions, item value, merchant credit risk score, merchant cash flow, and so on. At an operation "11", the lender devices 118 receive the solicitation for the bid and, at an operation "12", each lender device may generate and send a bid (or "offer"). For example, each lender may determine whether they would like to bid on the loan and, if so, may generate custom terms for financing the cost of the item.

At an operation "13", the payment service 110 receives the bid(s) and, at an operation "14" sends a second UI indicating these bids to the merchant device 114. Along with the bids, the payment service 110 may also provide recommendations and predictions as to how each bid will affect the merchant's cash flow both short-term and long-term. The merchant device 114 receives and presents the UI at an operation "15" and, at an operation "16", receives a selection of a bid from the merchant 102 and sends an indication of the selection to the payment service 110. The payment service 110 receives the indication of the selection at an operation "17" and, in response, may facilitate the loan between the merchant 102 and the lender associated with the selected bid. In some instances, this includes sending an indication of the selection to the appropriate lender device and sending information for connecting with the merchant 102 via the merchant device 114 or otherwise. In other instances, this may include the payment service 110 generating loan documents and working with the lender and merchant to consummate the loan according to the selected bid. In addition to transfer of funds, the payment service 110 may help create automatic repayment of the loan via sales made by the merchant. The payment service 110 facilitates such "timed" network connections between the lender and the merchant to persist the duration of the loan. In case the same lender offers another loan after the expiration of a previous loan, the payment service 110 can leverage the existing network connections to facilitate the subsequent loans.

FIG. 3 illustrates an example UI 300 that the payment service 110 may present on the merchant device 114 to enable the merchant 102 to request lending offers for financing individual items previously purchased using a financial instrument, such as a credit card or the like. As illustrated, the UI 300 includes a listing of items 302 that the merchant 102 has recently acquired using one or more financial instruments. In addition, the UI includes functionality, such as respective icons 304, that enable the merchant to request to finance one or more of the listed items. In this example, the item listing indicates that the merchant 102 has recently purchased twenty pounds of flour for $64.99, three hundred pizza boxes for $99.99, one pizza oven for $1,600.00, five pounds of pepperoni for $49.99, and two kitchen brooms for $45.99. The merchant 102 may use the icons 304 to request to receive bids to finance one or more of these items.

In addition, the example UI 300 includes a first suggestion 310 that the merchant 102 select a particular item. As introduced above, the suggestion module 134 may have determined to suggest this particular item to the user, based on analysis by the merchant-analysis module 138 and/or the capital-need-prediction module 136. For example, one or more of these modules may have determined that the merchant 102 may have an upcoming need for capital in an amount that is approximately equal, or less than but covered by, the cost of the pizza oven. Thus, the suggestion module 134 may suggest that the merchant 102 consider financing the cost of this item. In still other instances, the suggestion module 134 may make this suggestion based on the attractiveness of each particular item to lenders based on historical lending, or the like.

In addition, the UI 300 may include a second suggestion 312 indicating a particular lender ("Liberty Lenders") that the merchant may consider using. The suggestion module 134 may have determined that this lender may be beneficial to the merchant 102 because they have given favorable lending terms in the past for similar items, to similar merchants, to merchants in a similar area, and/or the like. This also allows the merchant to get an offer right away instead of bidding and invite offers which may or may not be as favorable as these "upfront" offers. Alternatively or additionally, the suggested lenders may be lenders from whom the merchant can specifically ask for bids.

In some instances, the UI 300 comprises a statement indicating items purchased by the merchant 102 using one or more payment instruments associated with respective financial institutions. For example, the UI 300 may comprise a monthly statement, a list of most recent purchases, and/or the like. In other instances, meanwhile, the UI 300 may include tools to enable the merchant 102 to filter/change the list of items shown and, thus, change the items that the merchant 102 may finance. For example, the merchant may filter the listed items based on any type of context associated with the purchases, such as the type of item purchased, the location at which an item was purchased, a risk associated with the item/purchase, a value/cost of the item, a merchant classification code (MCC) associated with the seller of an item, and/or the like.

FIG. 4 illustrates another example UI 400 that the payment service 110 may present on the merchant device 114 in response to the merchant requesting to finance the cost of a particular item, such as the pizza oven. In one implementation, selection of option 314 can generate a custom UI 400. In response to the merchant selecting option 314, the payment service 110 sends requests to one or more lenders, e.g., based on lender preferences or merchant preferences, for bids to finance merchant's purchased item or a bundle of items. In some instances, the payment service 110 can automatically and predictively generate bids or offers on behalf of the lenders based on lender data, data associated with similar lenders, and so on. As illustrated, the UI 400 includes a listing of the multiple lending offers 402 compiled by the payment service. In this example, the payment service has received three offers having varying lending terms 404. In addition, the UI 400 may include functionality, such as respective icons 406, for enabling the merchant 102 to select one of the offers. In addition, the UI 400 may include a suggestion 408 regarding which lending offer the payment service 110 suggests that the merchant 102 considers accepting. The UI 400 may also include a link ("See Why") that, when selected, presents information regarding the reason(s) behind the suggestion. In some instances, the suggestion module 134 may generate the suggestion 408 based on upcoming cash flow needs of the merchant, a current balance of the merchant account, the history of the lender, the actual lending terms, and/or the like. In other instances, the suggestion 408 can be based on the network and device infrastructure of the lender and the merchant, and suggestion 408 may be based on the option that has least friction from the perspective of technical implementation.

FIG. 5 illustrates example operation of the capital-need prediction module 136 and the merchant-analysis module 138. As illustrated, these modules may determine, based on current and historical data associated with the merchant 102, when the merchant 102 is likely to need additional cashflow to ensure that a balance of an account of the merchant does not fall below a threshold balance. In response to making this determination, the payment service 110 may suggest, to the merchant, that the merchant finance the cost of one or more acquired items to avoid the balance falling below the minimum balance, as noted above.

As FIG. 5 illustrates, the capital-need prediction module 136 may generate data indicating a balance of a merchant account as that balance changes over time. In some instances, the data or similar data may be presented to the merchant or other users, via POS devices, client devices, and/or the like. For example, FIG. 5 illustrates data 502 indicating a current balance of the merchant account as that balance changes over time, data 510 indicating a balance of the same merchant account during a prior month, and data 512 indicating a current balance of a "similar merchant" (e.g., based on a merchant category) as the balance of the similar merchant changes over time. The capital-need prediction module 136 may generate and analyze this type of data for predicting when a particular merchant may need additional capital. Further, while this example describes determining if and when the merchant 102 may need additional capital, it is to be appreciated that the capital-need prediction module 136 may generate this information for the additional merchants 102, customers, or other any other user associated with the payment service 110. In any event, the capital-need prediction module 136 may access the merchant data 142 associated with the merchant 102 to determine the balance of the merchant account as the balance changes over time. Furthermore, while the generated data 502 illustrates the balance of the account as the balance changes over time, in other instances the data displayed to the user may illustrate varying historical data (e.g., cash flow) and/or minimum-balance data for a specific item, a specific use-case, a specific merchant location, and so forth.

Merchant data 142 may include data such as: a current balance in the merchant account; recurring deposits to the account (e.g., a weekly or monthly paycheck), or other type of deposit made into the account on a recurring periodic basis; recurring withdraws, outflows, and bill payments made out of the account on a recurring periodic basis; pending activity, such as written but un-cashed checks; payment transactions performed on the POS devices or through ecommerce applications; and/or any other recurring and/or user designated activity involving the selected account.

Furthermore, the capital-need prediction module 136 may utilize the historical data of the merchant to determine a threshold, such as minimum balance 504, that the merchant account is to maintain over time. For example, the capital-need prediction module 136 may analyze the merchant data 142 associated with the merchant 102 and/or with other similarly situated merchants to determine a minimum balance that the merchant 102 is to maintain in the merchant account in order to ensure steady operation of the business of the merchant. In some instances, the minimum balance is determined and/or suggested by the capital-need prediction module 136 based on analysis of the merchant data 142 by the merchant-analysis module 138. In other instances, the minimum balance 504 is set by the merchant 102 (e.g., via the merchant device 104). In still other instances, the merchant 102 may provide an indication of a desired level of risk, which, in combination with analysis of the merchant data 142 by the merchant-analysis module 138, may be used to determine the minimum balance 504. It is also to be appreciated that while FIG. 5 illustrates a constant minimum balance, in some instances the minimum balance 504 may vary over time, such as based on seasonality of a business of a merchant 102, upcoming events that occur near the location of the merchant and are predicted to result in an increase of payments into and/or out of the merchant account, and/or the like.

As FIG. 5 further illustrates, the capital-need prediction module 136 may store information regarding the past balance of the merchant account as the balance has changed over time, as well as a current balance of the merchant account at a current time 506. In addition, the capital-need prediction module 136 may use one or more predictive models to determine a predicted time 508 at which the merchant account of the merchant 102 is predicted to fall below the minimum threshold. That is, the predictive model may, based on historical data of the merchant 102 and/or other similarly situated merchants, predict a future time at which the merchant account 102 would dip below the minimum balance 504 if the merchant 102 is not provided with some amount of loaned funds, such as funds received via financing of individual items as described herein.

In response to determining the predicted time 508, the payment service 110 may determine an amount of funds that, if received by the merchant 102, would allow the merchant account to keep a balance that is greater than the minimum balance 504. That is, based on the historical data associated with the merchant, the capital-need prediction module 136 may determine the amount of funds needed by the merchant 102(1), which in turn may be used by the suggestion module 134 for determining one or more items to suggest to the merchant 102 for financing. For example, the suggestion module 134 may use this information to generate a suggestion that the merchant 102 finance one or more items before the predicted time 508.

In order to determine the predicted time 504 at which the merchant account is predicted to dip below the minimum balance 504 in this manner, the capital-need prediction module 136 may generate one or more of the predictive models 132 for the merchant account and/or for multiple merchant accounts. In some instances, the capital-need prediction module 136 uses the historical data associated with the merchant 102 and/or with one or more other merchants to train the predictive models. These predictive models 132 may comprise neural networks, support vector machines, or any other type of trained classifier.

Furthermore, in some instances, a capital need may be identified based on or more of an array of factors. For example, a capital need may be identified from historical data from the merchant data 142 or other use indicating a relatively-large recurring purchase, such as a large monthly, quarterly, or yearly purchase. In another example, capital need may be identified in response to determining that a merchant has hired one or more employees (or a relatively large number of employees compared to the merchant's historical hiring cycles), that the merchant has opened a new location, that the merchant has indicated a need or desire to order new equipment, or the like. In still other examples, capital need may be determined based on the presence of a relatively large unexpected (or expected) expense, upcoming tax payments, the addition of a new service at the merchant (e.g., offering a new payment method requiring use of new payment hardware), and/or the like.

Figure 6A:
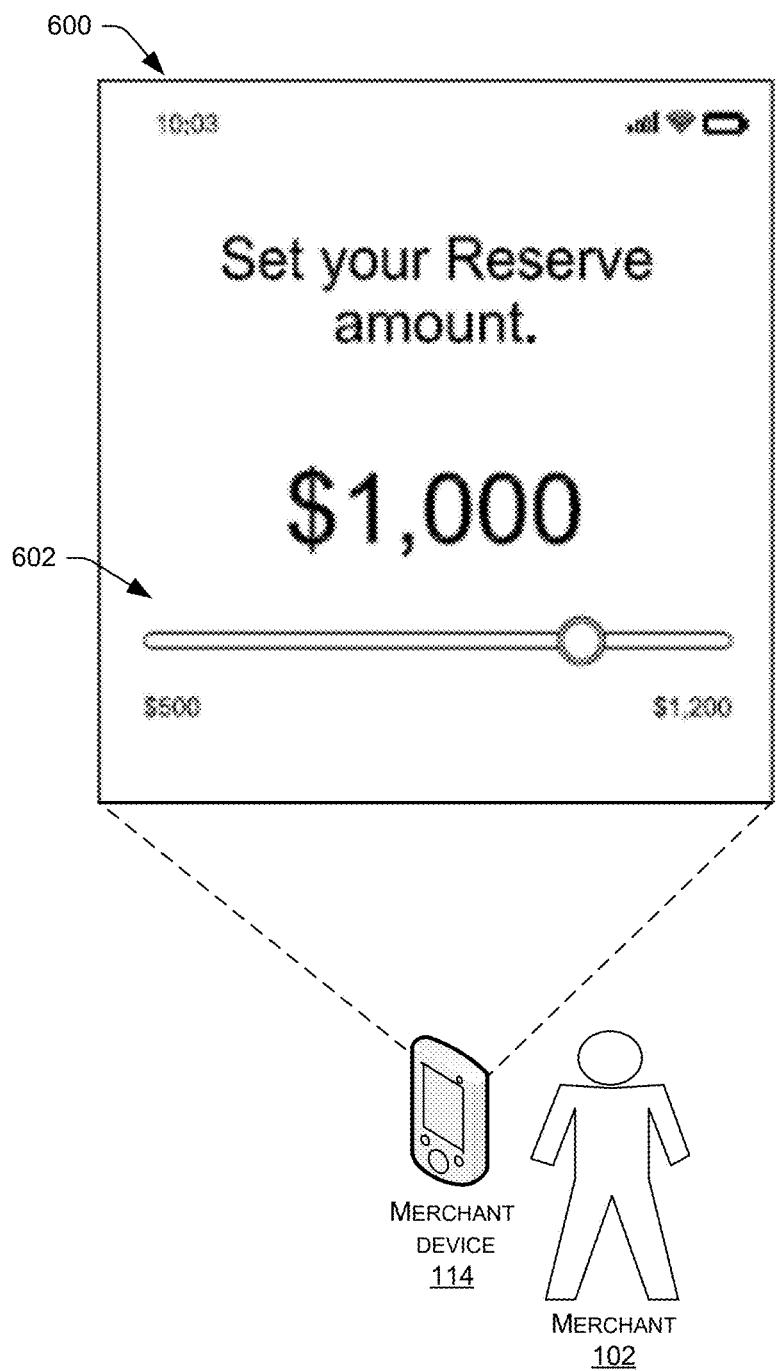
FIGS. 6A-B illustrate example UIs that the payment service may present on the merchant device to enable the merchant to set the minimum balance or specify desired loan terms.

FIG. 6A illustrates an example UI 600 that the payment service may present on the merchant device to enable the merchant to set the threshold balance 504 illustrated in FIG. 5. In this example, the UI 600 includes a slider 602 that, when moved left or right by the merchant, changes the minimum balance 504. As the minimum balance changes, the capital-need-prediction module 136 may generate different predictions of when the balance of the account of the merchant 102 is predicted to fall below the minimum balance, thus changing when the suggestion module 134 generates the suggestions and, potentially, the content of these suggestions. Of course, while a slider bar is illustrated, it is to be appreciated that the merchant 102 may specify the minimum balance 504 in any other suitable manner. Further, while FIGS. 3, 4, and 6 illustrate example UIs, it is to be appreciated that the described techniques may utilize any other type of UIs, whether visual, audible, or the like.

Figure 6B:
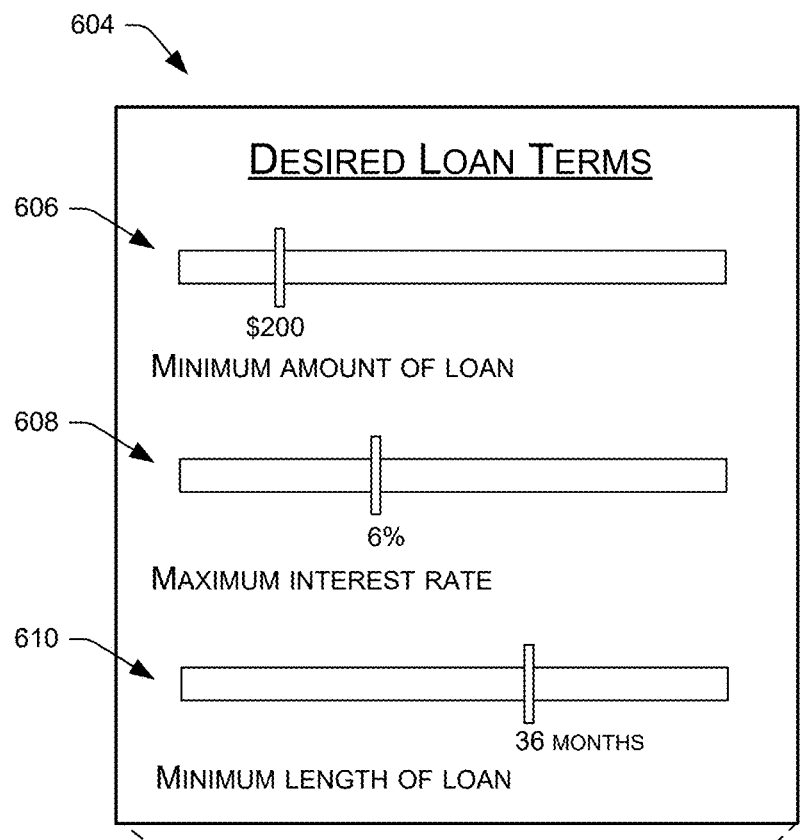
Figure 6B:
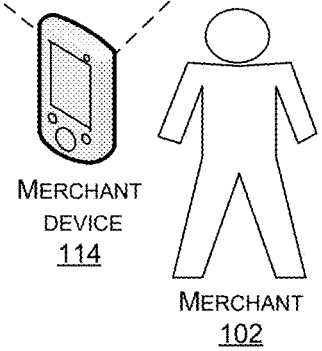

FIG. 6B, for example, illustrates an example UI 604 with which the merchant can set their preferences that indicate their appetite to accept certain bids over others. For example, the merchant can, using slider scales or other controls, indicate the maximum and/or minimum terms that they are willing to accept for a specific item. For example, the UI 604 includes a slider 606 that enables the merchant 102 to select a desired minimum amount of the loan. In this example, the merchant 102 has indicated that the loan for a particular item(s) is to be for at least $200. The UI 604 further includes a slider 608 that enables the merchant 102 to indicate the maximum interest rate that they are interested in. In this example, the merchant 102 has selected a maximum interest rate of 6%. The UI 604 further includes a slider 610 that enables the merchant 102 to select a minimum length of the loan, such as 36 months in this example. It is to be appreciated that while the UI 604 illustrates several example selections, the UI 604 may include additional and/or different controls for selecting different desired terms, such as a maximum amount of the loan, a maximum length of the loan, criteria regarding the type of lender the merchant 102 would like to receive offers from, and/or the like. In some instances, the payment service 110 can provide recommendations to what the maximum and/or minimum levels should be to expect an offer. A similar UI can also be presented to the lender device to indicate their "best offer" based on merchant or merchant risk profile.

Figure 7A:
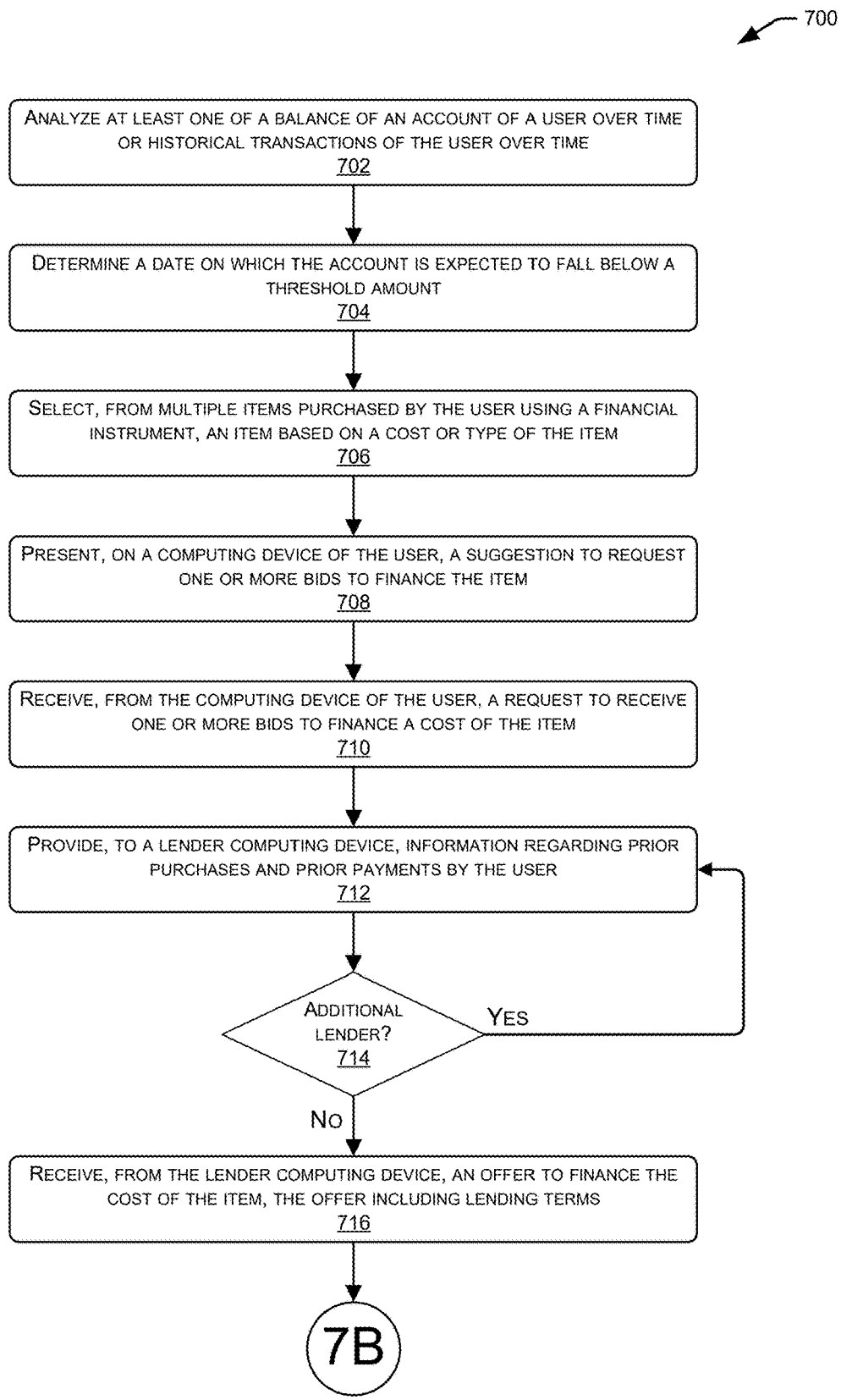
FIGS. 7A-B collectively illustrate a flow diagram that the payment service may implement to enable a merchant or other user to finance the cost of one or more individual items after the merchant or other user has purchased the item using another financial instrument.
Figure 7B:
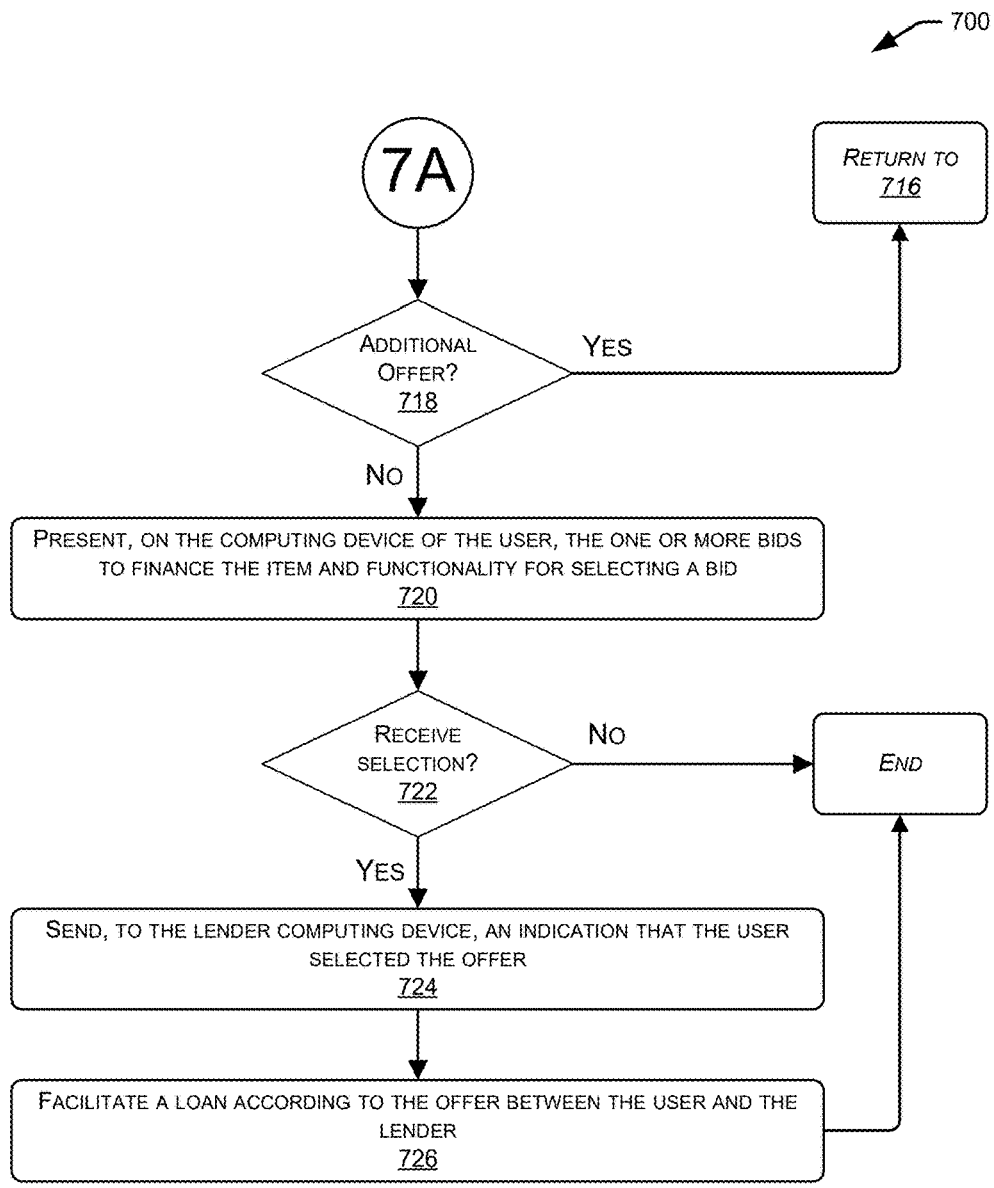

FIGS. 7A-B collectively illustrate a flow diagram that the payment service 110 may implement to enable a merchant or other user to finance the cost of one or more individual items after the merchant 102 or other user has purchased the item using another financial instrument. The process 700, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, modules, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by modules of the payment service 110, the merchant device 114, other devices, and/or combinations thereof.

At an operation 702, the payment service 110 may analyze at least one of a balance of an account of a user over time or historical transactions of the user over time. In some instances, the user may comprise a merchant for which the payment service 110 process transactions between the merchant and one or customers. Further, in one example, the merchant-analysis module 138 may analyze historical data from the merchant data 142.

At an operation 704, the payment service 110 may determine, based at least at least in part on the analyzing, timing when the balance of the account is expected to fall below a threshold amount. For example, the capital-need-prediction module 136 may determine, based on the analyzing, when the balance of the account is expected to fall below a minimum balance. As described above, the payment service 110 may suggest or generate the minimum balance, or the user may select this balance.

At an operation 706, the payment service 110 may select, from multiple items purchased by the user using one or more financial instruments, the item based at least in part on the cost of the item or a type of the item. For example, the suggestion module 134 may select an item to suggest to the user for financing. In some instances, the suggestion module 134 selects an item having a cost that, if lent against, would ensure that the balance of the user account would not fall below the minimum balance. In addition, or in the alternative, the suggestion module 134 may select an item associated with an item type that lenders have historically financed or provided relatively good lending terms for.

At an operation 708, the payment service 110 may present, on a computing device of the user and at least partly in response to the selecting, a suggestion to request financing offers, or one or more bids to finance the cost of the item. For example, the payment service 110 may present, on the merchant device 114, the UI 300 described above with reference to FIG. 3.

At an operation 710, the payment service 110 may receive, from the computing device of the user, a request to receive one or more bids to finance a cost of an item purchased by the user using a financial instrument. For example, the user may select a particular item, such as the pizza oven illustrated on the UI 300, for which the user would like to receive one or more bids for financing the cost of the item.

At an operation 712, the payment service 110 may provide, to a lender computing device of a lender, information regarding prior purchases made by the user with the financial instrument and prior payments made by the user for the prior purchases. This information may be used by the lender for determining whether to generate a lending offer for financing the cost of the item and, if so, the lending terms. An operation 714 represents determining whether to send this information an additional lender, such as to each of the lender devices 118. In some instances, the payment service 110 may select one or more lenders for receiving the information based on the type of the item being financed, the cost of the item being financed, and/or the like.

If there is an additional lender to receive the information, then the process 700 may return to the operation 712. If not, then at an operation 716, the payment service 110 may receiving, from a lender computing device, an offer from the lender to finance the cost of the item, with the first offer being associated with first lending terms. These lending terms may include information such as a total amount financed, a length of the loan, payment amounts, interest amount, and/or the like. In some instances, the lending terms may also include incentives such as bundle other items that the merchant may have purchased into the offer to improve the chances of a lender's bid being accepted.

FIG. 7B continues the illustration of the process 700 and includes, at an operation 718, determining whether there is an additional offer received from a lender. If so, then the process returns to the operation 716. If not, then at an operation 720, the payment service 110 may present, on the computing device, a graphical user interface (GUI) that includes each lending offer that has been received and functionality for selecting one of the offers.

At an operation 722, the payment service 110 determines whether it has received, from the user, a selection of an offer. If not, then the process 700 may end. If so, however, then at an operation 724, the payment service 110 may send, to the first lender computing device, an indication that the user has selected the particular offer for financing the cost of the item that the user purchased using the financial instrument. Finally, at an operation 726, the payment service 110 may facilitate a loan between the lender and the user according to the selected offer. Facilitating the loan may include determining account details associated with the merchant, determining information regarding the selected lender, and determining compatibility between the lender network and the merchant device. After doing so, the payment service 110 may further facilitate the loan by creating a network-specific connection between the lender device and the merchant device to enable the lender and the merchant to share data therebetween for consummating the agreement. In addition, upon receiving an indication that the loan agreement has been consummated by both the lender and the merchant, the payment service may facilitate the transfer of funds from an account of the lender to an account of the merchant. In some instances, facilitating the loan may receiving, from an account associated with the lender, a first electronic transfer of funds for financing the cost of the item and sending a second electronic transfer of funds to an account associated with the user.

Figure 8:
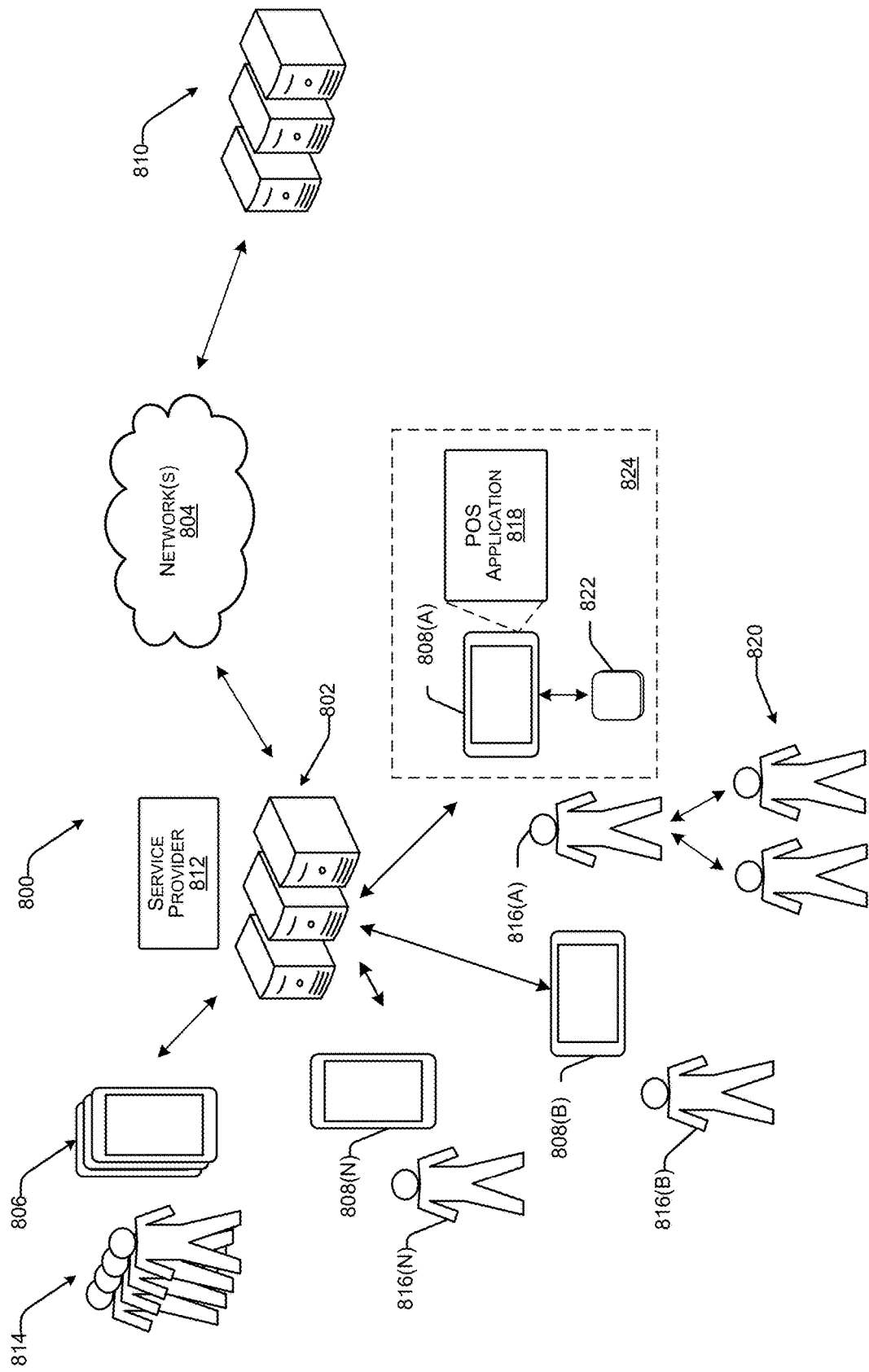
FIG. 8 is an example network environment in which the described techniques may be implemented.

FIG. 8 illustrates an example environment 800. The environment 800 includes server computing device(s) 802 that can communicate over a network 804 with user devices 806 (which, in some examples can be merchant devices 808 (individually, 808(A)-808(N))) and/or server computing device(s) 810 associated with third-party service provider(s). The server computing device(s) 802 can be associated with a service provider 812 that can provide one or more services for the benefit of users 814, as described below. Actions attributed to the service provider 812 can be performed by the server computing device(s) 802.

With reference to FIG. 1, the server computing device(s) 802 can correspond to the server computing device(s) of the payment service 110. Furthermore, the user devices 806 can correspond to the merchant device 114, or other merchant and/or customer devices. In at least one example, the service provider 812 can correspond to the payment service 110 described above.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers, and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider 812 or which can be an otherwise dedicated application. In at least one example, a user 814 can interact with the user interface via touch input, spoken input, or any other type of input.

As described above, in at least one example, the users 814 can include merchants 816 (individually, 816(A)-816(N)). In an example, the merchants 816 can operate respective merchant devices 808, which can be user devices 806 configured for use by merchants 816. For the purpose of this discussion, a "merchant" can be any entity that offers items (e.g., goods or services) for purchase or other means of acquisition (e.g., rent, borrow, barter, etc.). The merchants 816 can offer items for purchase or other means of acquisition via brick-and-mortar stores, mobile stores (e.g., pop-up shops, food trucks, etc.), online stores, combinations of the foregoing, and so forth. In some examples, at least some of the merchants 816 can be associated with a same entity but can have different merchant locations and/or can have franchise/franchisee relationships. In additional or alternative examples, the merchants 816 can be different merchants. That is, in at least one example, the merchant 816(A) is a different merchant than the merchant 816(B) and/or the merchant 816(C).

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, employer identification numbers (EIN)s, lines of business (in some examples), inventories (or at least portions thereof), and/or the like. That is, the use of the term "different merchants" does not refer to a merchant with various merchant locations or franchise/franchisee relationships.

Each merchant device 808 can have an instance of a POS application 818 stored thereon. The POS application 818 can configure the merchant device 808 as a POS terminal, which enables the merchant 816(A) to interact with one or more customers 820. As described above, the users 814 can include customers, such as the customers 820 shown as interacting with the merchant 816(A). For the purpose of this discussion, a "customer" can be any entity that acquires items from merchants. While only two customers 820 are illustrated in FIG. 8, any number of customers 820 can interact with the merchants 816. Further, while FIG. 8 illustrates the customers 820 interacting with the merchant 816(A), the customers 820 can interact with any of the merchants 816.

In at least one example, interactions between the customers 820 and the merchants 816 that involve the exchange of funds (from the customers 820) for items (from the merchants 816) can be referred to as "POS transactions" and/or "transactions." In at least one example, the POS application 818 can determine transaction data associated with the POS transactions. Transaction data can include payment information, which can be obtained from a reader device 822 associated with the merchant device 808(A), user authentication data, purchase amount information, point-of-purchase information (e.g., item(s) purchased, date of purchase, time of purchase, etc.), etc. The POS application 818 can send transaction data to the server computing device(s) 802. Furthermore, the POS application 818 can present a UI to enable the merchant 816(A) to interact with the POS application 818 and/or the service provider 812 via the POS application 818.

In at least one example, the merchant device 808(A) can be a special-purpose computing device configured as a POS terminal (via the execution of the POS application 818). In at least one example, the POS terminal may be connected to a reader device 822, which is capable of accepting a variety of payment instruments, such as credit cards, debit cards, gift cards, short-range communication-based payment instruments, and the like, as described below. In some examples, the reader device 822 can read information from alternative payment instruments including, but not limited to, wristbands and the like.

The POS terminal can be paired with a reader device 822 to comprise a POS system 824. The reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the reader device 822, and communicate with the server computing device(s) 802, which can provide, among other services, a payment processing service. The service provider 812 can communicate with server computing device(s) 810, as described below. In this manner, the POS terminal and reader device 822 may collectively process transaction(s) between the merchants 816 and customers 820. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device).

While, the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to the customers 820. In additional or alternative examples, the POS terminal can have a display integrated therein for presenting information to the customers 820. POS systems, such as the POS system 824, may be mobile, such that POS terminals and reader devices may process transactions in disparate locations across the world. POS systems can be used for processing card-present transactions and card-not-present (CNP) transactions, as described below.

A card-present transaction is a transaction where both a customer 820 and his or her payment instrument are physically present at the time of the transaction. Card-present transactions may be processed by swipes, dips, taps, or any other interaction between a physical payment instrument (e.g., a card) and a reader device 822 whereby the reader device 822 is able to obtain payment data from the payment instrument. A swipe is a card-present transaction where a customer 820 slides a card, or other payment instrument, having a magnetic strip through a reader device 822 that captures payment data contained in the magnetic strip. A dip is a card-present transaction where a customer 820 inserts a payment instrument having an embedded microchip (i.e., chip) into a reader device 822 first. The dipped payment instrument remains in the payment reader until the reader device 822 prompts the customer 820 to remove the card, or other payment instrument. While the payment instrument is in the reader device 822, the microchip can create a one-time code which is sent from the POS system 824 to the server computing device(s) 810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 820 may tap or hover his or her payment instrument (e.g., card, electronic device such as a smart phone running a payment application, etc.) over a reader device 822 to complete a transaction via short-range communication (e.g., NFC, RFID, Bluetooth®, BLE, etc.). Short-range communication enables the payment instrument to exchange information with the reader device 822. A tap may also be called a contactless payment.

A CNP transaction is a transaction where a card, or other payment instrument, are not physically present at the POS such that payment data is required to be manually keyed in (e.g., by a merchant, customer, etc.), or payment data is required to be recalled from a card-on-file data store, to complete the transaction.

The POS system 824, the server computing device(s) 802, and/or the server computing device(s) 810 may exchange payment information and transaction data to determine whether transactions are authorized. For example, the POS system 824 may provide encrypted payment data, user authentication data, purchase amount information, point-of-purchase information, etc. (collectively, transaction data) to server computing device(s) 802 over the network(s) 804. The server computing device(s) 802 may send the transaction data to the server computing device(s) 810. As described above, in at least one example, the server computing device(s) 810 can be associated with third-party service providers that provide payment services, including but not limited to, an acquirer bank, an issuer, and/or a card payment network (e.g., Mastercard®, VISA®, etc.)\

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 810 associated therewith) can send a fund transfer request to a server computing device of a card payment network (e.g., Mastercard®, VISA®, etc.) to determine whether the transaction is authorized or deficient. In at least one example, the service provider 812 can serve as an acquirer and connect directly with the card payment network.

The card payment network (e.g., the server computing device(s) 810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 810 associated therewith) can make a determination as to whether the customer has the capacity to absorb the relevant charge associated with the payment transaction. In at least one example, the service provider 812 can serve as an issuer and/or can partner with an issuer. The transaction is either approved or rejected by the issuer and/or the card payment network (e.g., the server computing device(s) 810 associated therewith), and a payment authorization message is communicated from the issuer to the POS device via a path opposite of that described above, or via an alternate path.

As described above, the server computing device(s) 810, which can be associated with payment service provider(s), may determine whether the transaction is authorized based on the transaction data, as well as information relating to parties to the transaction (e.g., the customer 820 and/or the merchant 816(A)). The server computing device(s) 810 may send an authorization notification over the network(s) 804 to the server computing device(s) 802, which may send the authorization notification to the POS system 824 over the network(s) 804 to indicate whether the transaction is authorized. The server computing device(s) 802 may also transmit additional information such as transaction identifiers to the POS system 824. In one example, the server computing device(s) 802 may include a merchant application and/or other functional modules for communicating with the POS system 824 and/or the server computing device(s) 810 to authorize or decline transactions.

Based on the authentication notification that is received by the POS system 824 from server computing device(s) 810, the merchant 816(A) may indicate to the customer 820 whether the transaction has been approved. In some examples, approval may be indicated at the POS system 824, for example, at a display of the POS system 824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 812 can provide, among other services, payment processing services, inventory management services, catalog management services, business banking services, financing services, web-development services, payroll services, employee management services, appointment services, restaurant management services, order management services, delivery/courier services, peer-to-peer payment services, onboarding services, identity verification (IDV) services, and so on. In some examples, the users 814 can access all of the services of the service provider 812. In other examples, the users 814 can have gradated access to the services, which can be based on risk tolerance, IDV outputs, subscriptions, and so on. In at least one example, access to such services can be availed to the merchants 816 via the POS application 818. In additional or alternative examples, each service can be associated with its own access point (e.g., application, web browser, etc.).

The service provider 812 can offer payment processing services for processing payments on behalf of the merchants 816, as described above. For example, the service provider 812 can provision payment processing software, payment processing hardware and/or payment processing services to merchants 816, as described above, to enable the merchants 816 to receive payments from the customers 820 when conducting POS transactions with the customers 820. For instance, the service provider 812 can enable the merchants 816 to receive cash payments, payment card payments, and/or electronic payments from customers 820 for POS transactions and the service provider 812 can process transactions on behalf of the merchants 816.

As the service provider 812 processes transactions on behalf of the merchants 816, the service provider 812 can maintain accounts or balances for the merchants 816 in one or more ledgers. For example, the service provider 812 can analyze transaction data received for a transaction to determine an amount of funds owed to a merchant 816(A) for the transaction. In at least one example, such an amount can be a total purchase price less fees charged by the service provider 812 for providing the payment processing services. Based on determining the amount of funds owed to the merchant 816(A), the service provider 812 can deposit funds into an account of the merchant 816(A). The account can have a stored balance, which can be managed by the service provider 812. The account can be different from a conventional bank account at least because the stored balance is managed by a ledger of the service provider 812 and the associated funds are accessible via various withdrawal channels including, but not limited to, scheduled deposit, same-day deposit, instant deposit, and a linked payment instrument.

A scheduled deposit can occur when the service provider 812 transfers funds associated with a stored balance of the merchant 816(A) to a bank account of the merchant 816(A) that is held at a bank or other financial institution (e.g., associated with the server computing device(s) 810). Scheduled deposits can occur at a prearranged time after a POS transaction is funded, which can be a business day after the POS transaction occurred, or sooner or later. In some examples, the merchant 816(A) can access funds prior to a scheduled deposit. For instance, the merchant 816(A) may have access to same-day deposits (e.g., wherein the service provider 812 deposits funds from the stored balance to a linked bank account of the merchant on a same day as POS transaction, in some examples prior to the POS transaction being funded) or instant deposits (e.g., wherein the service provider 812 deposits funds from the stored balance to a linked bank account of the merchant on demand, such as responsive to a request). Further, in at least one example, the merchant 816(A) can have a payment instrument that is linked to the stored balance that enables the merchant to access the funds without first transferring the funds from the account managed by the service provider 812 to the bank account of the merchant 816(A).

In at least one example, the service provider 812 may provide inventory management services. That is, the service provider 812 may provide inventory tracking and reporting. Inventory management services may enable the merchant 816(A) to access and manage a database storing data associated with a quantity of each item that the merchant 816(A) has available (i.e., an inventory). Furthermore, in at least one example, the service provider 812 can provide catalog management services to enable the merchant 816(A) to maintain a catalog, which can be a database storing data associated with items that the merchant 816(A) has available for acquisition (i.e., catalog management services). In at least one example, the catalog may include a plurality of data items and a data item of the plurality of data items may represent an item that the merchant 1461(A) has available for acquisition.

In at least one example, the service provider 812 can provide business banking services, which allow the merchant 816(A) to track deposits (from payment processing and/or other sources of funds) into an account of the merchant 816(A), payroll payments from the account (e.g., payments to employees of the merchant 816(A)), payments to other merchants (e.g., business-to-business) directly from the account or from a linked debit card, withdrawals made via scheduled deposit and/or instant deposit, etc. Furthermore, the business banking services can enable the merchant 816(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 816 to visualize their cash flow to track their financial health, set aside money for upcoming obligations (e.g., savings), organize money around goals, etc.

In at least one example, the service provider 812 can provide financing services and products, such as via business loans, consumer loans, fixed term loans, flexible term loans, and the like. In at least one example, the service provider 812 can utilize one or more risk signals to determine whether to extend financing offers and/or terms associated with such financing offers.

In at least one example, the service provider 812 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 812 can offer different types of capital loan products. For instance, in at least one example, the service provider 812 can offer a daily repayment loan product, wherein a capital loan is repaid daily, for instance, from a portion of transactions processed by the payment processing service on behalf of the borrower. Additionally and/or alternatively, the service provider 812 can offer a monthly repayment loan product, wherein a capital loan is repaid monthly, for instance, via a debit from a bank account linked to the payment processing service.

Additionally or alternatively, the service provider 812 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 816. The service provider 812 can generate the loan based at least in part on determining that the borrower purchased or intends to purchase the item from the merchant. The loan can be associated with a balance based on an actual purchase price of the item and the borrower can repay the loan overtime. In some examples, the borrower can repay the loan via installments, which can be paid via a stored balance associated with the service provider 812. The service provider 812 can offer specific financial products, such as payment instruments, tied specifically to the loan products. For example, in one implementation, the server provider 812 associate capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 812 can provide web-development services, which enable users 814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presence, such as social media posts for example.

Furthermore, the service provider 812 can provide payroll services to enable employers to pay employees for work performed on behalf of employers. In at least one example, the service provider 812 can receive data that includes time worked by an employee, sales made by the employee, gratuities received by the employee, and so forth. Based on such data, the service provider 812 can make payroll payments to employee(s) on behalf of an employer via the payroll service. For instance, the service provider 812 can facilitate the transfer of a total amount to be paid out for the payroll of an employee from the bank of the employer to the bank of the service provider 812 to be used to make payroll payments. In at least one example, when the funds have been received at the bank of the service provider 812, the service provider 812 can pay the employee, such as by check or direct deposit, often a day, a week, or more after when the work was actually performed by the employee. In additional or alternative examples, the service provider 812 can enable employee(s) to receive payments via same-day or instant deposit based at least in part on risk and/or reliability analyses performed by the service provider 812.

Moreover, in at least one example, the service provider 812 can provide employee management services for managing schedules of employees. Further, the service provider 812 can provide appointment services for enabling users 814 to set schedules for scheduling appointments and/or users 814 to schedule appointments.

In some examples, the service provider 812 can provide restaurant management services to enable users 814 to make and/or manage reservations, to monitor front-of-house and/or back-of-house operations, and so on. In at least one example, the service provider 812 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

As described above, the service provider 812 can provide courier services, wherein couriers can travel between multiple locations to provide delivery services, photography services, etc. Couriers can be users 814 who can travel between locations to perform services for a requesting user 814 (e.g., deliver items, capture images, etc.). In some examples, the courier can receive compensation from the service provider 812. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations.

In at least one example, the service provider 812 can provide a peer-to-peer payment service that enables peer-to-peer payments between two or more users 814. In at least one example, the service provider 812 can communicate with instances of a payment application (or other access point) installed on devices 806 configured for operation by users 814. In an example, an instance of the payment application executing on a first device operated by a payor can send a request to the service provider 812 to transfer an amount of funds (e.g., fiat currency or non-fiat currency such as cryptocurrency, securities, and related assets) from an account of the payor to an account of a payee (e.g., a peer-to-peer payment). The service provider 812 can facilitate the transfer and can send a notification to an instance of the payment application executing on a second mobile device operated by the payee that the transfer is in process (or has been completed). In some examples, the service provider 812 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 814 may be new to the service provider 812 such that the user 814 that has not registered (e.g., subscribed to receive access to one or more services offered by the service provider) with the service provider 812. The service provider 812 can offer onboarding services for registering a potential user 814 with the service provider 812. In some examples, onboarding can involve presenting various questions, prompts, and the like to a potential user 814 to obtain information that can be used to generate a profile for the potential user 814. Responsive to the potential user 814 providing all necessary information, the potential user 814 can be onboarded to the service provider 812.

The service provider 812 can be associated with IDV services, which can be used by the service provider 812 for compliance purposes and/or can be offered as a service, for instance to third-party service providers (e.g., associated with the server computing device(s) 810). That is, the service provider 812 can offer IDV services to verify the identity of users 814 seeking to use or using their services. Identity verification requires a customer (or potential customer) to provide information that is used by compliance departments to prove that the information is associated with an identity of a real person or entity. In at least one example, the service provider 812 can perform services for determining whether identifying information provided by a user 814 accurately identifies the customer (or potential customer) (i.e., Is the customer who they say they are?).

The service provider 812 is capable of providing additional or alternative services and the services described above are offered as a sampling of services. In at least one example, the service provider 812 can exchange data with the server computing device(s) 810 associated with third-party service providers. Such third-party service providers can provide information that enables the service provider 812 to provide services, such as those described above. In additional or alternative examples, such third-party service providers can access services of the service provider 812. That is, in some examples, the third-party service providers can be subscribers, or otherwise access, services of the service provider 812.

Techniques described herein can be configured to operate in both real-time/online and offline modes. "Online" modes refer to modes when devices are capable of communicating with the service provider 812 (e.g., the server computing device(s) 802) and/or the server computing device(s) 810 via the network(s) 804. In some examples, the merchant device(s) 808 are not capable of connecting with the service provider 812 (e.g., the server computing device(s) 802) and/or the server computing device(s) 810, due to a network connectivity issue, for example. In additional or alternative examples, the server computing device(s) 802 are not capable of communicating with the server computing device(s) 810 due to network connectivity issue, for example. In such examples, devices may operate in "offline" mode where at least some payment data is stored (e.g., on the merchant device(s) 808) and/or the server computing device(s) 802 until connectivity is restored and the payment data can be transmitted to the server computing device(s) 802 and/or the server computing device(s) 810 for processing.

Figure 9:
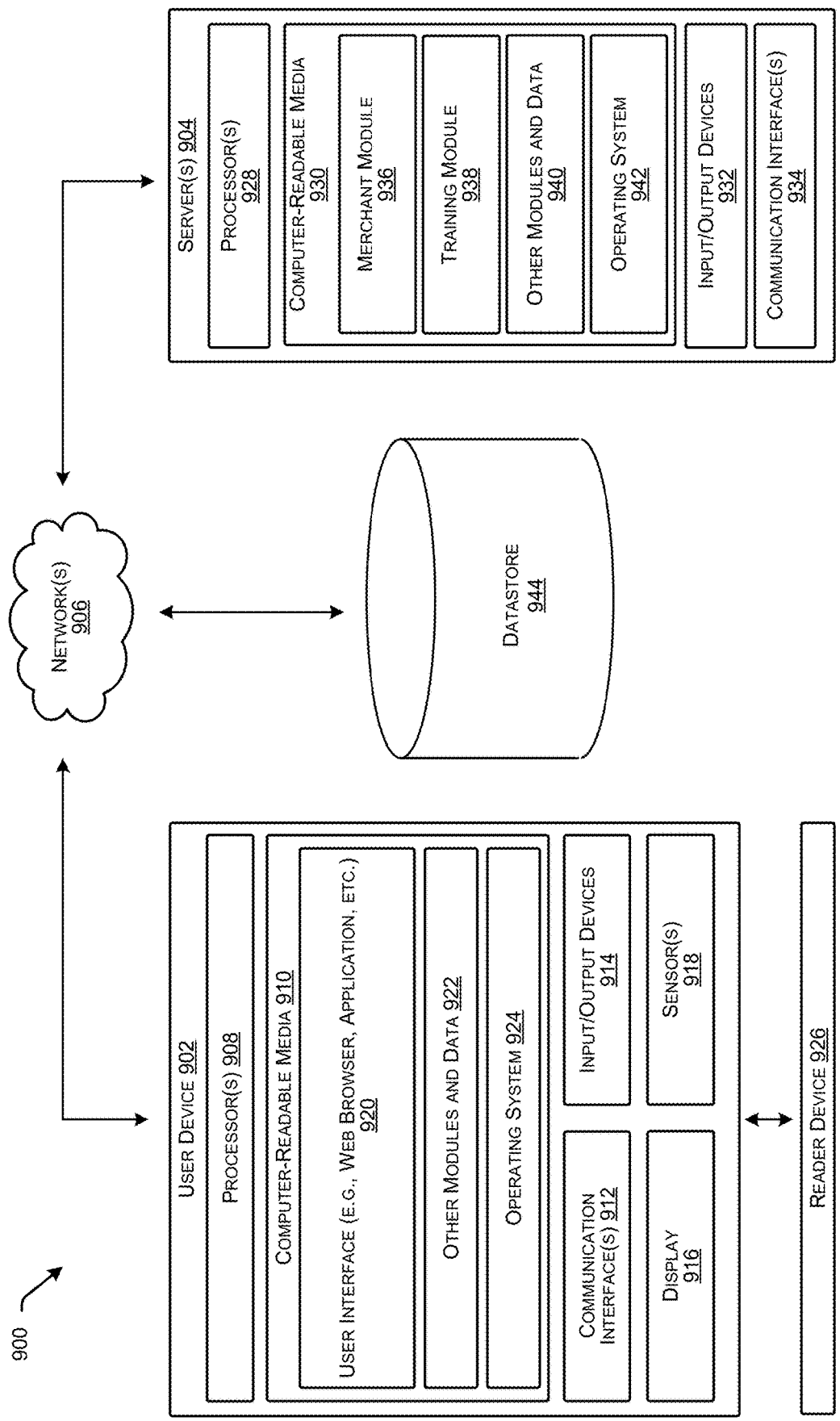
FIG. 9 are example hardware and/or software modules that may implement the described techniques.

FIG. 9 depicts an illustrative block diagram illustrating a system 900 for performing techniques described herein. The system 900 includes a user device 902, that communicates with server computing device(s) (e.g., server(s) 904) via network(s) 906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 902 is illustrated, in additional or alternate examples, the system 900 can have multiple user devices, as described above with reference to FIG. 8. For example, the user device 902 can correspond to any one of the merchant computing device 104 the photographer courier computing device 106, or the image capturing device 108, as described above with reference to FIG. 1.

In at least one example, the user device 902 can be any suitable type of computing device, e.g., portable, semi-portable, semi-stationary, or stationary. Some examples of the user device 902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 902 can be any computing device capable of sending communications and performing the functions according to the techniques described herein. The user device 902 can include devices, e.g., payment card readers, or modules capable of accepting payments, as described below.

In the illustrated example, the user device 902 includes one or more processors 908, one or more computer-readable media 910, one or more communication interface(s) 912, one or more input/output (I/O) devices 914, a display 916, and sensor(s) 918.

In at least one example, each processor 908 can itself comprise one or more processors or processing cores. For example, the processor(s) 908 can be implemented as one or more microprocessors, microcomputers, microcontrollers, digital signal processors, central processing units, state machines, logic circuitries, and/or any devices that manipulate signals based on operational instructions. In some examples, the processor(s) 908 can be one or more hardware processors and/or logic circuits of any suitable type specifically programmed or configured to execute the algorithms and processes described herein. The processor(s) 908 can be configured to fetch and execute computer-readable processor-executable instructions stored in the computer-readable media 910.

Depending on the configuration of the user device 902, the computer-readable media 910 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 910 can include, but is not limited to, RAM, ROM, EEPROM, flash memory, solid-state storage, magnetic disk storage, optical storage, and/or other computer-readable media technology. Further, in some examples, the user device 902 can access external storage, such as RAID storage systems, storage arrays, network attached storage, storage area networks, cloud storage, or any other medium that can be used to store information and that can be accessed by the processor(s) 908 directly or through another computing device or network. Accordingly, the computer-readable media 910 can be computer storage media able to store instructions, modules or modules that can be executed by the processor(s) 908. Further, when mentioned, non-transitory computer-readable media exclude media such as energy, carrier signals, electromagnetic waves, and signals per se.

The computer-readable media 910 can be used to store and maintain any number of functional modules that are executable by the processor(s) 908. In some implementations, these functional modules comprise instructions or programs that are executable by the processor(s) 908 and that, when executed, implement operational logic for performing the actions and services attributed above to the user device 902. Functional modules stored in the computer-readable media 910 can include a user interface 920 to enable users to interact with the user device 902, and thus the server(s) 904 and/or other networked devices. In at least one example, the user interface 920 can be presented via a web browser, or the like. In other examples, the user interface 920 can be presented via an application, such as a mobile application or desktop application, which can be provided by a service provider 812 associated with the server(s) 904, or which can be an otherwise dedicated application. In some examples, the user interface 920 can be the ecommerce user interface 124, the courier user interface 128, or the image capturing user interface 130. In at least one example, a user can interact with the user interface via touch input, spoken input, gesture, or any other type of input. The word "input" is also used to describe "contextual" input that may not be directly provided by the user via the user interface 920. For example, user's interactions with the user interface 920 are analyzed using, e.g., natural language processing techniques, to determine context or intent of the user, which may be treated in a manner similar to "direct" user input.

Depending on the type of the user device 902, the computer-readable media 910 can also optionally include other functional modules and data, such as other modules and data 922, which can include programs, drivers, etc., and the data used or generated by the functional modules. In some instances, the other modules and data 922 may comprise the same functionality and data as that described above with reference to the Merchant device 114 and other client devices. In addition, the computer-readable media 910 can also store data, data structures and the like, that are used by the functional modules. Further, the user device 902 can include many other logical, programmatic and physical modules, of which those described are merely examples that are related to the discussion herein.

In at least one example, the computer-readable media 910 can include additional functional modules, such as an operating system 924 for controlling and managing various functions of the user device 902 and for enabling basic user interactions.

The communication interface(s) 912 can include one or more interfaces and hardware modules for enabling communication with various other devices, such as over the network(s) 906 or directly. For example, communication interface(s) 912 can enable communication through one or more network(s) 906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Modules used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 902 can further include one or more input/output (I/O) devices 914. The I/O devices 914 can include speakers, a microphone, a camera, and various user controls (e.g., buttons, a joystick, a keyboard, a keypad, etc.), a haptic output device, and so forth. The I/O devices 914 can also include attachments that leverage the accessories (audio-jack, USB-C, Bluetooth, etc.) to connect with the user device 902.

In at least one example, user device 902 can include a display 916. Depending on the type of computing device(s) used as the user device 902, the display 916 can employ any suitable display technology. For example, the display 916 can be a liquid crystal display, a plasma display, a light emitting diode display, an OLED (organic light-emitting diode) display, an electronic paper display, or any other suitable type of display able to present digital content thereon. In at least one example, the display 916 can be an augmented reality display, a virtually reality display, or any other display able to present and/or project digital content. In some examples, the display 916 can have a touch sensor associated with the display 916 to provide a touchscreen display configured to receive touch inputs for enabling interaction with a graphic interface presented on the display 916. Accordingly, implementations herein are not limited to any particular display technology. Alternatively, in some examples, the user device 902 may not include the display 916, and information can be presented by other means, such as aurally, hapticly, etc.

In addition, the user device 902 can include sensor(s) 918. The sensor(s) 918 can include a GPS device able to indicate location information. Further, the sensor(s) 918 can include, but are not limited to, an accelerometer, gyroscope, compass, proximity sensor, camera, microphone, and/or a switch.

Additionally, the user device 902 can include various other modules that are not shown, examples of which include removable storage, a power source, such as a battery and power control unit, a barcode scanner, a printer, a cash drawer, and so forth.

In addition, in some examples, the user device 902 can include, be connectable to, or otherwise be coupled to a reader device 926, for reading payment instruments and/or identifiers associated with payment objects. In some examples, as described above, the reader device 926 can plug in to a port in the user device 902, such as a microphone/headphone port, a data port, or other suitable port. In additional or alternative examples, the reader device 926 can be coupled to the user device 902 via another wired or wireless connection, such as via a Bluetooth®, BLE, and so on. The reader device 926 can include a read head for reading a magnetic strip of a payment card, and further can include encryption technology for encrypting the information read from the magnetic strip. Additionally or alternatively, the reader device 926 can be an EMV payment reader, which in some examples, can be embedded in the user device 902. Moreover, numerous other types of readers can be employed with the user device 902 herein, depending on the type and configuration of the user device 902.

The reader device 926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 926 may include hardware implementation, such as slots, magnetic tracks, and rails with one or more sensors or electrical contacts to facilitate detection and acceptance of a payment instrument. That is, the reader device 926 may include hardware implementations to enable the reader device 926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 926 may also include a biometric sensor to receive and process biometric characteristics and process them as payment instruments, given that such biometric characteristics are registered with the payment service system and connected to a financial account with a bank server.

The reader device 926 may include processing unit(s), computer-readable media, a reader chip, a transaction chip, a timer, a clock, a network interface, a power supply, and so on. The processing unit(s) of the reader device 926 may execute one or more modules and/or processes to cause the reader device 926 to perform a variety of functions, as set forth above and explained in further detail in the following disclosure. In some examples, the processing unit(s) may include a central processing unit (CPU), a graphics processing unit (GPU), a CPU and a GPU, or processing units or modules known in the art. Additionally, each of the processing unit(s) may possess its own local memory, which also may store program modules, program data, and/or one or more operating systems. Depending on the exact configuration and type of the reader device 926, the computer-readable media may include volatile memory (such as RAM), non-volatile memory (such as ROM, flash memory, miniature hard drive, memory card, or the like), or some combination thereof. In at least one example, the computer-readable media of the reader device 926 may include at least one module for performing various functions as described herein.

The reader chip may perform functionalities to control the operations and processing of the reader device 926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by modules of reader device 926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 902, which can be a POS terminal, and the reader device 926 are shown as separate devices, in additional or alternative examples, the user device 902 and the reader device 926 can be part of a single device, which may be a battery-operated device. In such an example, modules of both the user device 902 and the reader device 926 may be associated with the single device. In some examples, the reader device 926 can have a display integrated therewith, which can be in addition to (or as an alternative of) the display 916 associated with the user device 902.

The server(s) 904 can include one or more servers or other types of computing devices that can be embodied in any number of ways. For example, in the example of a server, the modules, other functional modules, and data can be implemented on a single server, a cluster of servers, a server farm or data center, a cloud-hosted computing service, a cloud-hosted storage service, and so forth, although other computer architectures can additionally or alternatively be used. In at least one example, the server(s) 904 can correspond to the server computing device(s) 102 described above with reference to FIG. 1.

Further, while the figures illustrate the modules and data of the server(s) 904 as being present in a single location, these modules and data can alternatively be distributed across different computing devices and different locations in any manner. Consequently, the functions can be implemented by one or more server computing devices, with the various functionality described above distributed in various ways across the different computing devices. Multiple server(s) 904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 904 can include one or more processors 928, one or more computer-readable media 930, one or more I/O devices 932, and one or more communication interfaces 934. Each processor 928 can be a single processing unit or a number of processing units, and can include single or multiple computing units or multiple processing cores. The processor(s) 928 can be implemented as one or more microprocessors, microcomputers, microcontrollers, digital signal processors, central processing units, state machines, logic circuitries, and/or any devices that manipulate signals based on operational instructions. For example, the processor(s) 928 can be one or more hardware processors and/or logic circuits of any suitable type specifically programmed or configured to execute the algorithms and processes described herein. The processor(s) 928 can be configured to fetch and execute computer-readable instructions stored in the computer-readable media 930, which can program the processor(s) 928 to perform the functions described herein.

The computer-readable media 930 can include volatile and nonvolatile memory and/or removable and non-removable media implemented in any type of technology for storage of information, such as computer-readable instructions, data structures, program modules, or other data. Such computer-readable media 930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 904, the computer-readable media 930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 930 can be used to store any number of functional modules that are executable by the processor(s) 928. In many implementations, these functional modules comprise instructions or programs that are executable by the processors 928 and that, when executed, specifically configure the one or more processors 928 to perform the actions attributed above to the service provider 812 and/or payment processing service. Functional modules stored in the computer-readable media 930 can optionally include a merchant module 936, a training module 938, and one or more other modules and data 940.

The merchant module 936 can be configured to receive transaction data from POS systems, such as the POS system 824 described above with reference to FIG. 8. The merchant module 936 can transmit requests (e.g., authorization, capture, settlement, etc.) to payment service server computing device(s) to facilitate POS transactions between merchants and customers. The merchant module 936 can communicate the successes or failures of the POS transactions to the POS systems. In some examples, the payment processing module 116, described above, and the merchant module 936 can perform the same or similar functions.

The training module 938 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 902 and/or the server(s) 904 for use at a time after the data models have been trained (e.g., at runtime).

The one or more other modules and data 940 can include programs, drivers, etc., and the data used or generated by the functional modules. Further, the server(s) 904 can include many other logical, programmatic and physical modules, of which those described above are merely examples that are related to the discussion herein. In some instances, the other modules and data 922 may comprise the same functionality and data as that described above with reference to the payment service 110.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In some examples, a module may include one or more application programming interfaces (APIs) to perform some or all of its functionality (e.g., operations). In additional and/or alternative examples, the module(s) may be implemented as computer-readable instructions, various data structures, and so forth via at least one processing unit to configure the computing device(s) described herein to execute instructions and to perform operations as described herein. The computer-readable media 930 can additionally include an operating system 942 for controlling and managing various functions of the server (s) 904.

The communication interface(s) 934 can include one or more interfaces and hardware modules for enabling communication with various other devices, such as over the network(s) 906 or directly. For example, communication interface(s) 934 can enable communication through one or more network(s) 906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Modules used for such communications can depend at least in part upon the type of network, the environment selected, or both. Protocols for communicating over such networks are well known and will not be discussed herein in detail.

The server(s) 904 can further be equipped with various I/O devices 932. Such I/O devices 932 can include a display, various user interface controls (e.g., buttons, joystick, keyboard, mouse, touch screen, biometric or sensory input devices, etc.), audio speakers, connection ports and so forth.

In at least one example, the system 900 can include a datastore 944 that can be configured to store data that is accessible, manageable, and updatable. In some examples, the datastore 944 can be integrated with the user device 902 and/or the server(s) 904. In other examples, as shown in FIG. 9, the datastore 944 can be located remotely from the server(s) 904 and can be accessible to the server(s) 904. The datastore 944 can comprise multiple databases and/or servers connected locally and/or remotely via the network(s) 906.

In at least one example, the datastore 944 can store user profiles, which can include merchant profiles, customer profiles, courier profiles, and so on, as described above. Furthermore, in at least one example, the datastore 944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 944 can store additional or alternative types of data (e.g., image(s) 120, etc.) as described herein.

In at least one example, the datastore 944 can be associated with a brand asset database, which can store information associated with brand assets associated with merchants. A brand asset can be a logo (e.g., text logo, graphic logo, favicon, etc.), a font, a color, an image, an icon, a button style, effects, spacing, and the like used in association with a brand of the merchant. In some examples, a brand asset can be associated with multiple content items, which can be applicable to different end users and/or intended viewers. For instance, a brand asset corresponding to a logo can be associated with a logo that is presented to customers and a logo that is presented to merchants. In some examples, image(s) captured via techniques described herein can be added to the brand asset database and/or data associated with the brand asset database can be used for informing guidance as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples. If the specification states a module or feature "can," "may," "could," or "might" be included or have a characteristic, that particular module or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various techniques described herein refer to "requests" and/or "prompts." For the purpose of this discussion, a "request" or a "prompt" can be a data item transmitted between computing devices described herein with instructions for performing and/or taking an action (e.g., a "request") and/or a recommendation for performing and/or taking an action (e.g., a "prompt"). In some examples, the "requests" and/or "prompts" can be associated with graphical user interface (GUI) elements that are to be presented via a user interface to communicate the instructions to a user of a respective user device.

Various figures included herein are flowcharts showing example methods involving techniques as described herein. The methods illustrated are described for convenience and ease of understanding. However, the methods illustrated are not limited to being performed using modules described in the illustrated figures, and such modules are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, modules, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed:

1. A system comprising:
one or more memories storing instructions; and
one or more processors that execute the instructions to perform operations comprising:
processing payment transactions on behalf of a user based at least in part on transaction data received from a user computing device of the user;
training a predictive machine learning model using, as training data, historical transaction data of accounts of a plurality of users determined to share a characteristic with the user, the historical transaction data including data related to payments involving the accounts of the plurality of users, the training of the predictive machine learning model including training of the predictive machine learning model to predict changes in account balances of users;
analyzing account information associated with an account of the user using the trained predictive machine learning model to predict a date on which a balance of the account of the user is expected to fall below a threshold amount;
determining an amount for an item, wherein the item is purchased by the user or intended to be purchased by the user;
determining that financing for the amount of the item is predicted to prevent the account of the user from falling below the threshold amount on the date;
generating a bidding request for the amount of the item;
sending the bidding request to a plurality of computing systems respectively associated with a plurality of different financial institutions;
sending a communication to the user computing device to cause the user computing device to present a graphical user interface (GUI) that includes a plurality of offers for financing for least a portion of the amount of the item, the plurality of offers having been received as bids from the plurality of computing systems;
receiving, from the user computing device, a selection through the GUI of a first offer of the plurality of offers; and
based on the selection of the first offer, establishing a secure communication session between an entity associated with the first offer via application programming interface (API) calls, wherein the secure communication session is customized based on at least the entity, the user computing device, and data structures associated with the account of the user; and
sending, through the secure communication session, an instruction to cause an electronic transfer of funds to the account of the user to proactively finance for least the portion of the amount of the item and to prevent the account of the user from falling below the threshold amount on the date.

2. The system as recited in claim 1, wherein the one or more processors are associated with a payment service provider, wherein the first offer is provided by the payment service provider, and wherein the first offer is associated with lending terms offered by the payment service provider.

3. The system as recited in claim 1, wherein the one or more processors are associated with a payment service provider, wherein the first offer is provided by a financial institution and associated with lending terms offered by the financial institution, wherein a second offer is provided by the payment service provider, and wherein the second offer is associated with lending terms offered by the payment service provider.

4. The system as recited in claim 1, the operations further comprising:
   determining an amount for a second item, wherein the second item is purchased by the user or intended to be purchased by the user;
   presenting, in the GUI on the user computing device, a second plurality of offers for financing at least a portion of the amount for the second item in addition to the plurality of offers for financing at least the portion of the amount for the item; and
   receiving, from the user computing device, via the GUI, the selection of the first offer for financing at least the portion of the amount for the item and selection of a second offer for financing at least the portion of the amount for the second item, wherein the first offer is received from a first entity, and wherein the second offer is received from a second entity that is different from the first entity.

5. The system as recited in claim 1,
   wherein the API calls are made to a computing device of a first financial institution and the user computing device, and wherein the first offer is provided by the first financial institution.

6. The system as recited in claim 1, wherein the secure communication session is customized by the one or more processors based at least in part on characteristics of a computing device of a first financial institution and characteristics of the user computing device.

7. The system as recited in claim 1, the operations further comprising:
   generating a statement indicating prior purchases made by the user with a financial instrument, wherein payments for the prior purchases were processed by a payment service provider associated with the one or more processors, and wherein the statement indicates the item.

8. A method comprising:
   processing, by one or more processors, payment transactions on behalf of a user based at least in part on transaction data received from a user computing device of the user;
   training a predictive machine learning model using, as training data, historical transaction data of accounts of a plurality of users determined to share a characteristic with the user, the historical transaction data including data related to payments involving the accounts of the plurality of users, the training of the predictive machine learning model including training of the predictive machine learning model to predict changes in account balances of users;
   analyzing, by the one or more processors, account information associated with an account of the user using the trained predictive machine learning model to predict a date on which a balance of the account of the user is expected to fall below a threshold amount;
   determining, by the one or more processors, an amount for an item, wherein the item is purchased by the user or intended to be purchased by the user;
   determining that financing for the amount of the item is predicted to prevent the account of the user from falling below the threshold amount on the date;
   generating, by the one or more processors, a bidding request for the amount of the item;
   sending, by the one or more processors, the bidding request to a plurality of computing systems respectively associated with a plurality of different financial institutions;
   sending, by the one or more processors, a communication to the user computing device to cause, at least in part, the user computing device to present a graphical user interface (GUI) that includes a plurality of offers for financing for at least a portion of the amount for the item, the plurality of offers having been received as bids from the plurality of computing systems;
   receiving, by the one or more processors, from the user computing device a selection through the GUI of a first offer of the plurality of offers; and
   based on the selection of the first offer, establishing a secure communication session between an entity associated with the first offer via application programming interface (API) calls, wherein the secure communication session is customized based on at least the entity, the user computing device, and data structures associated with the account of the user; and
   sending, through the secure communication session and by the one or more processors, an instruction to cause an electronic transfer of funds to the account of the user to proactively finance for at least the portion of the amount of the item and to prevent the account of the user from falling below the threshold amount on the date.

9. The method as recited in claim 8, wherein the one or more processors are associated with a payment service provider, wherein the first offer is provided by the payment service provider, and wherein the first offer is associated with lending terms offered by the payment service provider.

10. The method as recited in claim 8, wherein the one or more processors are associated with a payment service provider, wherein the first offer is provided by a financial institution and associated with lending terms offered by the financial institution, wherein a second offer is provided by the payment service provider, and wherein the second offer is associated with lending terms offered by the payment service provider.

11. The method as recited in claim 8, further comprising:
    determining an amount for a second item, wherein the second item is purchased by the user or intended to be purchased by the user;
    causing, at least in part, the user computing device to present, in the GUI, a second plurality of offers for financing at least a portion of the amount for the second item in addition to the plurality of offers for financing at least the portion of the amount for the item; and
    receiving, from the user computing device, via the GUI, the selection of the first offer for financing at least the portion of the amount for the item and selection of a second offer for financing at least the portion of the amount for the second item, wherein the first offer is received from a first entity, and wherein the second offer is received from a second entity that is different from the first entity.

12. The method as recited in claim 8, wherein the API calls are made to a computing device of a first financial institution and the user computing device, and wherein the first offer is provided by the first financial institution.

13. The method as recited in claim 8, wherein the secure communication session is customized by the one or more processors based at least in part on characteristics of a computing device of a first financial institution and characteristics of the user computing device.

14. The method as recited in claim 8, further comprising:
generating, by the one or more processors, a statement indicating prior purchases made by the user with a financial instrument, wherein payments for the prior purchases were processed by a payment service provider associated with the one or more processors, and wherein the statement indicates the item.

15. One or more non-transitory computer-readable media storing instructions executable by one or more processors to configure the one or more processors to perform operations comprising:
processing payment transactions on behalf of a user based at least in part on transaction data received from a user computing device of the user;
training a predictive machine learning model using, as training data, historical transaction data of accounts of a plurality of users determined to share a characteristic with the user, the historical transaction data including data related to payments involving the accounts of the plurality of users, the training of the predictive model including training of the predictive machine learning model to predict changes in account balances of users;
analyzing account information associated with an account of the user using the trained predictive machine learning model to predict a date on which a balance of the account of the user is expected to fall below a threshold amount;
determining an amount for an item, wherein the item is purchased by the user or intended to be purchased by the user;
determining that financing for the amount of the item is predicted to prevent the account of the user from falling below the threshold amount on the date;
generating a bidding request for the amount of the item;
sending the bidding request to a plurality of computing systems respectively associated with a plurality of different financial institutions;
causing, at least in part, the user computing device to present a graphical user interface (GUI) that includes a plurality of offers for financing for at least a portion of the amount for the item, the plurality of offers having been received as bids from the plurality of computing systems;
receiving, from the user computing device a selection through the GUI of a first offer of the plurality of offers; and
based on the selection of the first offer, establishing a secure communication session between an entity associated with the first offer via application programming interface (API) calls, wherein the secure communication session is customized based on at least the entity, the user computing device, and data structures associated with the account of the user; and
sending, through the secure communication session, an instruction to cause an electronic transfer of funds to the account of the user to proactively finance for at least the portion of the amount of the item and to prevent the account of the user from falling below the threshold amount on the date.

16. The one or more non-transitory computer-readable media as recited in claim 15, wherein the one or more processors are associated with a payment service provider, wherein the first offer is provided by the payment service provider, and wherein the first offer is associated with lending terms offered by the payment service provider.

17. The one or more non-transitory computer-readable media as recited in claim 15, wherein the one or more processors are associated with a payment service provider, wherein the first offer is provided by a financial institution and associated with lending terms offered by the financial institution, wherein a second offer is provided by the payment service provider, and wherein the second offer is associated with lending terms offered by the payment service provider.

18. The one or more non-transitory computer-readable media as recited in claim 15, the operations further comprising:
determining an amount for a second item, wherein the second item is purchased by the user or intended to be purchased by the user;
causing, at least in part, the user computing device to present, in the GUI, a second plurality of offers for financing at least a portion of the amount for the second item in addition to the plurality of offers for financing at least the portion of the amount for the item; and
receiving, from the user computing device, via the GUI, the selection of the first offer for financing at least the portion of the amount for the item and selection of a second offer for financing at least the portion of the amount for the second item, wherein the first offer is received from a first entity, and wherein the second offer is received from a second entity that is different from the first entity.

19. The one or more non-transitory computer-readable media as recited in claim 15, wherein the API calls are made to a computing device of a first financial institution and the user computing device, wherein the first offer is provided by the first financial institution.

20. The one or more non-transitory computer-readable media as recited in claim 15, the operations further comprising:
generating a statement indicating prior purchases made by the user with a financial instrument, wherein payments for the prior purchases were processed by a payment service provider associated with the one or more processors, and wherein the statement indicates the item.

* * * * *